United States Patent
Kalyanasundaram et al.

(10) Patent No.: US 10,671,131 B2
(45) Date of Patent: Jun. 2, 2020

(54) PREDICTIVE CONTROL SYSTEMS AND METHODS

(71) Applicant: Apple Inc., Cupertino, CA (US)

(72) Inventors: Nagarajan Kalyanasundaram, San Jose, CA (US); Jay S. Nigen, Mountain View, CA (US); James S. Ismail, San Jose, CA (US); Richard H. Tan, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/871,526

(22) Filed: Sep. 30, 2015

(65) Prior Publication Data

US 2016/0357232 A1    Dec. 8, 2016

Related U.S. Application Data

(60) Provisional application No. 62/171,964, filed on Jun. 5, 2015.

(51) Int. Cl.
*G06F 1/20* (2006.01)
*G06F 1/329* (2019.01)
*G06F 1/3296* (2019.01)

(52) U.S. Cl.
CPC .............. *G06F 1/206* (2013.01); *G06F 1/329* (2013.01); *G06F 1/3296* (2013.01); *Y02D 10/24* (2018.01)

(58) Field of Classification Search
CPC ........ G06F 1/206; G06F 1/329; G06F 1/3296; Y02D 10/24
See application file for complete search history.

(56) References Cited

U.S. PATENT DOCUMENTS 6,373,033 B1    4/2002   de Waard et al.
7,246,014 B2 *  7/2007   Forth .................... G01D 4/004
                                                    702/57

(Continued)

FOREIGN PATENT DOCUMENTS

EP    1655655 A2    10/2006
EP    1655655 A2    5/2008

(Continued)

OTHER PUBLICATIONS

Jayaseelan et al. Temperature Aware Scheduling for Embedded Processors. [online] pp. 541-546. Retrieved From the Internet <https://ieeexplore.ieee.org/stamp/stamp.jsp?tp=&arnumber=4749728&tag=1> (Year: 2009).*

(Continued)

*Primary Examiner* — Emerson C Puente
*Assistant Examiner* — Jonathan R Labud
(74) *Attorney, Agent, or Firm* — Womble Bond Dickinson (US) LLP

(57) ABSTRACT

Systems and methods are disclosed for determining a current machine state of a processing device, predicting a future processing task to be performed by the processing device at a future time, and predicting a list of intervening processing tasks to be performed by a first time (e.g. a current time) and the start of the future processing task. The future processing task has an associated initial state. A feed-forward thermal prediction model determines a predicted future machine state at the time for starting the future processing task. Heat mitigation processes can be applied in advance of the starting of the future processing task, to meet the future initial machine state for starting the future processing task.

34 Claims, 17 Drawing Sheets

(56) References Cited

U.S. PATENT DOCUMENTS

| | | |
|---|---|---|
| 7,706,856 B2 | 4/2010 | Dean et al. |
| 8,190,276 B2 | 5/2012 | Lewis et al. |
| 8,280,456 B2 | 10/2012 | Hackborn et al. |
| 8,374,730 B2 | 2/2013 | Conroy et al. |
| 8,452,463 B2 | 5/2013 | Cox et al. |
| 8,538,484 B2 | 9/2013 | Chan et al. |
| 8,631,411 B1 * | 1/2014 | Ghose ............... G06F 1/206 361/676 |
| 8,909,383 B2 | 12/2014 | Hadderman et al. |
| 9,880,920 B2 | 1/2018 | Hackborn et al. |
| 2002/0065049 A1 * | 5/2002 | Chauvel ............ G06F 1/206 455/550.1 |
| 2007/0192641 A1 * | 8/2007 | Nagendra ............ G06F 1/3203 713/320 |
| 2007/0225871 A1 | 9/2007 | Karstens |
| 2008/0028778 A1 | 2/2008 | Millet |
| 2010/0063756 A1 * | 3/2010 | Agrawal ........... G01R 31/3693 702/63 |
| 2011/0035078 A1 | 2/2011 | Jackson |
| 2011/0040990 A1 * | 2/2011 | Chan .................. G06F 1/28 713/300 |
| 2011/0157191 A1 | 6/2011 | Huang et al. |
| 2012/0159201 A1 | 6/2012 | Distefano et al. |
| 2012/0209568 A1 * | 8/2012 | Arndt ............... G06F 11/3089 702/183 |
| 2013/0073096 A1 | 3/2013 | Brey et al. |
| 2013/0132972 A1 | 5/2013 | Sur et al. |
| 2013/0318384 A1 * | 11/2013 | Yoshihara ............ G06F 1/3296 713/323 |
| 2014/0229221 A1 * | 8/2014 | Shih ................. G06Q 10/06313 705/7.23 |
| 2015/0006937 A1 | 1/2015 | Rotem et al. |
| 2017/0139459 A1 * | 5/2017 | Badam ................... G06F 1/32 |

FOREIGN PATENT DOCUMENTS

| | | |
|---|---|---|
| JP | 2014507727 A | 3/2014 |
| KR | 20120085724 A | 8/2012 |
| TW | 201303550 A | 1/2013 |
| TW | 201502765 A | 1/2015 |
| TW | 105205229 | 4/2016 |

OTHER PUBLICATIONS

PCT International Search Report and The Written Opinion of The International Searching Authority for PCT/US2016/022568 dated May 30, 2016.

PCT Chapter I International Preliminary Report on Patentability (IPRP Chapter I) PCT/US2016/022568 dated Dec. 14, 2017. (8 Pages).

\* cited by examiner

|     | Sub-system      | Parameter 1          | Parameter 2         | Parameter 3      |
| --- | --------------- | -------------------- | ------------------- | ---------------- |
| 305 | System          | Watts/Δt             | Measured temperature |                  |
| 310 | CPU             | Clock rate           | Measured temperature |                  |
| 315 | GPU             | Clock rate           | Measured temperature |                  |
| 320 | Audio system    | Watts/Δt             | Measured temperature | Audio quality    |
| 325 | WiFi            | ON or OFF            | Measured temperature | Signal Quality   |
| 330 | Network         | Watts/Δt             | Measured temperature | Signal Quality   |
| 335 | Cell signal     | Watts/Δt             | Measured temperature | Signal Quality   |
| 340 | Display         | Watts/Δt or Brightness | Measured temperature | Video Resolution |
| 345 | Storage e.g. disk | Watts/Δt           | Measured temperature |                  |
| 350 | Battery charging | YES or NO           | Measured temperature | Charge rate      |
| 355 | Battery level   | Charge level         |                     |                  |
| 360 | Light detection | Light level          |                     |                  |
| 365 | Sound detection | Sound level          |                     |                  |
| 370 | @Home           | YES or NO            |                     |                  |
| 375 | In motion       | YES or NO            | Rate of motion      |                  |
| 380 | System run state | Standby or Run      |                     |                  |
| 385 | Supply voltage  | Level                |                     |                  |
| 390 | Weather forecast | Rain                | Wind                | Temperature      |

FIG. 3

| | Identifier | Process/Device Description | Δt | Watts | Parameter | Parameter Value |
|---|---|---|---|---|---|---|
| 410— | 0x0001 | Main processor(s) | 25 ms | 0.020 | Clock | 2.2 GHz |
| 415— | 0x0002 | Cooling fans | 100 ms | 0.080 | Run speed | 5% |
| 420— | 0x0003 | Graphics processor | 25 ms | 0.010 | Clock | 2.0 GHz |
| 425— | 0x0004 | Power converter | 100 ms | 0.050 | State | On/Off |
| 430— | 0x0005 | Audio Codec | 100 ms | 0.010 | | |
| 435— | 0x0006 | Audio amplifier | 100 ms | 0.050 | Output level | 20% |
| 440— | 0x0007 | Disk storage | 100 ms | 0.060 | Spin speed | Idle \| mid \| full |
| | | ... | | | | |
| 445— | 0x1000 | Kernel | 25 ms | 0.001 | Priority | 0xFF |
| 450— | 0x1010 | Scheduler | 25 ms | 0.001 | Priority | 0xFE |
| 455— | 0x10FF | System Idle process | 100 ms | 0.002 | Priority | 0x01 |
| | | ... | | | | |
| 460— | 0x8001 | Email application | 25 ms | 0.001 | Priority | 0x04 |
| 465— | 0x8002 | Email app – send mail | 5 ms | 0.001 | Priority | 0x04 |
| 470— | 0x8003 | Video conference app. | 25 ms | 0.002 | Priority | 0x50 |
| 475— | 0x8004 | Video game application | 25 ms | 0.003 | Priority | 0x60 |
| | | ... | | | | |

FIG. 4

| Date/Time Stamp yyyymmdd:hhmmss | Duration | Command or Event | Application | Thread | Watts | Machine state record |
|---|---|---|---|---|---|---|
| 20150415:10:19:24 | 00:00:03 | Click | Email | Launch | 0.025W | 0x17958476 |
| 20150415:10:20:00 | 00:00:36 | Click | Email | Read message | 0.015W | 0x17958578 |
| 20150415:10:21:15 | 00:03:48 | Click | Email | Reply | 0.015W | 0x17958605 |
| 20150415:10:25:03 | 00:05:39 | Command-Shift-Q | Email | Quit application | 0.01W | 0x17958788 |
| 20150415:10:32:03 | 00:00:00 | Click | NetFlix® | Launch | 0.02W | 0x17958902 |
| 20150415:10:32:10 | 00:00:07 | File | Open | NetFlix® | Open stream | 0.04W | 0x17958902 |
| 20150415:10:58:03 | 00:02:30 | Click | NetFlix® | Pause | 0.01W | 0x17981202 |
| 20150415:10:61:25 | 00:03:18 | Click | NetFlix® | Unpause | 0.02W | 0x17981250 |
| 20150415:11:32:03 | 01:00:00 | File | Exit | NetFlix® | Quit application | 2.50W | 0x17997243 |
| 20150415:12:00:05 | 00:00:00 | Click | Video conference | Launch | 0.02W | 0x17997243 |
| 20150415:12:02:23 | 00:00:01 | Shift-volume | Video conference | Increase volume | 0.01W | 0x18020003 |
| 20150415:12:03:15 | 00:00:01 | F1 key | Operating system | Decrease brightness | 0.01W | 0x18020120 |
| 20150415:13:12:41 | 01:12:36 | File | Exit | Video conference | Quit application | 2.04W | 0x18176323 |
| Weekday: 09:00:00 | 01:00:00 | | Video conference | | 2.00W | 0xF0001475 |
| Friday: 20:00:00 | 01:00:00 | | Video game | | 12.00W | 0xF0001475 |
| Weekday: 06:00:00 | 00:00:05 | | Email | | 0.10W | 0xF0001476 |
| Saturday: 20:00:00 | 02:00:00 | | NetFlix® | | 7.50W | 0xF0001477 |

FIG. 5

PREDICTIVE CONTROL SYSTEMS AND METHODS

RELATED APPLICATIONS

This United States Patent application claims priority under 35 U.S.C. § 119(e) of U.S. Patent Application No. 62/171,964, filed Jun. 5, 2015, and entitled "PREDICTIVE CONTROL SYSTEMS AND METHODS," which is incorporated herein by reference to the extent that it is consistent with this disclosure.

The present U.S. Patent application is related to the following U.S. Patent applications, each of which is incorporated herein by reference to the extent they are consistent with this disclosure:
  (1) Application Ser. No. 14/503,318, filed Sep. 30, 2014, entitled "THERMAL MITIGATION USING SELECTIVE TASK MODULATION;" and
  (2) Application Ser. No. 14/503,321, filed Sep. 30, 2014, entitled "THERMALLY ADAPTIVE QUALITY-OF-SERVICE."

TECHNICAL FIELD

This disclosure relates to the field of temperature control of an electronic device, and in particular, in one embodiment to predictive methods of temperature control of the electronic device.

BACKGROUND

In operation, an electronic device consumes electrical power and generates heat. The more power that a device consumes, the greater the heat generated by the device. A device such as a laptop or desktop computer, or portable electronic device, can contain heat-generating components such as a display, one or more processing units, a hard disk, and/or flash memory or other solid state drive memory and various sub-systems such as audio, telecommunications, and memory. The quantity of power consumed, and heat generated, can be sufficiently high that the device includes one or more fans for cooling the device. Some devices can include other energy saving (and heat reducing) features such as decreasing the clock rate of a processor in the device or reducing the brightness of a display in the device. Typically, an electronic device invokes heat-reducing procedures in response to a measured, present temperature of the electronic device. The heat-reducing procedures can affect the experience of a user of the device. For example, the fans may come on loud at a time that the user is on a video conference making it hard for the user, and others on the video conference, to hear each other. The clock speed of a processor may be automatically reduced in response to a measured, present temperature at a time when the user is playing a processor-intensive video game, thereby reducing the responsiveness of the device during game play. The brightness of the display may be reduced automatically in response to a measured, present temperature of the device when the user is trying to search for a place to have lunch on a sunny day, making it difficult to read the display of the device. Cooling means of the prior art are invoked in response to a measured, present temperature of a device and can negatively affect the user's experience using the electronic device.

SUMMARY OF THE DESCRIPTION

Embodiments are described herein for maximizing a user's experience using an electronic processing device by predicting a future task that the user will perform, and taking preemptive operations to cool the device before the start of the future processing task. In an embodiment, preparatory preemptive operations can be applied slowly and smoothly to give a user the feeling of a continuously-optimized computing experience. One or more preemptive operations to cool the processing device can be taken in response to a predicted temperature, distinct from a measured temperature. In an embodiment, preemptive cooling operations can be performed in conjunction with closed-loop cooling operations that are responsive to a measured temperature.

In one embodiment, a future processing task can be determined from a history of past processing tasks performed by the user. A time for the processing task can be predicted, and a list of intervening processing tasks can be predicted using the history of past processing tasks. A power requirement for each processing task can be determined from a database of power usage for processing tasks, so that the power utilization between a first time (or a current time) and the start time for the future processing task can be estimated. A current temperature for the electronic device and the list of intervening processing tasks, with their associated power requirements (or other thermal profile data), can be input into a feed-forward predictive model to predict the future temperature that the processing device will be at the start time of the future processing task. The processing device can then begin cooling the processing device over the period of time leading up to the future processing task. In an embodiment, the future task can be determined by analyzing a history of past processing tasks to determine a pattern of user behavior in past processing tasks. Determining a pattern of user behavior can include determining an approximate time of day that a user starts a particular task, determining an approximate duration that the user performs the particular task, determining a particular day of the week that the user performs the particular task, or any combination of these. In an embodiment, determining a future processing task can include examining data from a calendar application or parsing text of emails of an email application, such as to determine a date/time for a video conference. Determining a power requirement of a task can include looking up an incremental usage of power for a processing task and multiplying the increment by an estimated duration of the processing task. In an embodiment, determining a power requirement of a task can include looking up the processing task in a database of processing tasks. Preparing a processing device for the future processing task can include rescheduling one or more intervening tasks to a later time, lowering scheduling priority of one or more intervening tasks, reducing display brightness, or reducing clock speed of a processor, or a combination of these.

In another embodiment, a database of power usage requirements for processing tasks can be generated by determining an initial power utilization for a known initial set of processing tasks, such as the initial boot flow of a processing device. Then for each additional processing task that is launched, the power used for the processing task can be measured. In an embodiment, the power used by the processing task can be measured over the entire duration of the running of the processing task and stored. In another embodiment, power usage by the processing task can be sampled in increments of time, such as 25 milliseconds (25 ms). The power used over one or more increments can be averaged and stored. A factory or "seed" power usage database can be pre-installed on an electronic device. Then, actual, measured power usage can be acquired and stored and, over time, correct or replace the seed power usage database. A thermal management process can use the actual, measured power usage, or the pre-installed power usage database, or a weighted factor between the two, to predict the amount of power used—and thus, heat generated—by a particular processing task.

In yet another embodiment, a database of processing activities can be generated by a monitoring the starting of new tasks. A process within the kernel of the electronic device can perform the monitoring function. Alternatively, the monitoring function can be performed by a background process. In another embodiment, the kernel can send a message or generate an interrupt when the kernel detects the starting of a new processing task. When a new processing task starts, a thermal management process can monitor the process for a period of time and determine whether the process consumes more than a threshold amount of power. If not, it may not be worth storing the processing activity in a database. If a new process is determined to generate more than a threshold amount of power, then the current state of the processing machine can be stored and the start of the new process can be recorded in process history database. When the new processing task terminates, the total amount of power used by the processing task during its execution can also be stored in the process history database, along with the total execution time of the processing task. In an embodiment, the average power used by the processing task can be stored as an increment of, e.g., 25 ms.

In another embodiment, patterns of user behavior can be determined from the processing task history database. A query can be issued to the database to determine a user pattern, such as determining at what time on weekdays a user first accesses their processing device, and determining a first processing task that the user performs, such as checking email, and for how long the first process was performed. If a pattern is identified, the pattern can be stored in the processing task history database as a learned pattern record. In an embodiment, a stored machine state can be associated with a learned a pattern record. For example, the user may always perform a video conference when connected to Wi-Fi, to save high-cost cellular bandwidth. Similarly, a user may always perform game playing at home over a wired connection such as an Ethernet connection.

In yet another embodiment, a user can synchronize one or more of: the user history database, the power usage database, or machine states across a plurality of processing devices. In an embodiment, the plurality of processing devices can all be registered to a same user. The synchronization can be performed using a synchronization service. In some embodiments, at least some of the power usage information is not stored, if the type or size of the electronic devices differs. For example, an iPhone® may have substantially different power usage data than an iMac® and thus synchronizing the power usage databases may not make sense. However, a learned pattern, such as checking one's email at 9 a.m. every day, may be relevant independent of the type of processing device used to access email.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

At least certain embodiments include an environment with a calling software component interacting with a called software component through an API. A method for operating through an API in this environment includes transferring one or more function calls, messages, other types of invocations or parameters via the API.

Other features and advantages will be apparent from the accompanying drawings and from the detailed description.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 3 illustrates example attributes of a state of a processing device.

FIG. 4 illustrates example records and attributes of a power usage database.

FIG. 5 illustrates example records and attributes of a processing activity database.

DETAILED DESCRIPTION

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Embodiments are described for implementing systems and methods of preparing a future operating state for a future processing task on an electronic processing device, taking into account the current operating state of the processing device, and the power usage requirements of processing tasks that a scheduled, or predicted, to run on the processing device between a first predetermined time (such as the current time) and the time for starting the future processing task. The processing device can take preemptive steps to reduce heat over the duration of time starting with the first predetermined time to the start time for the future processing task.

Figure 1:
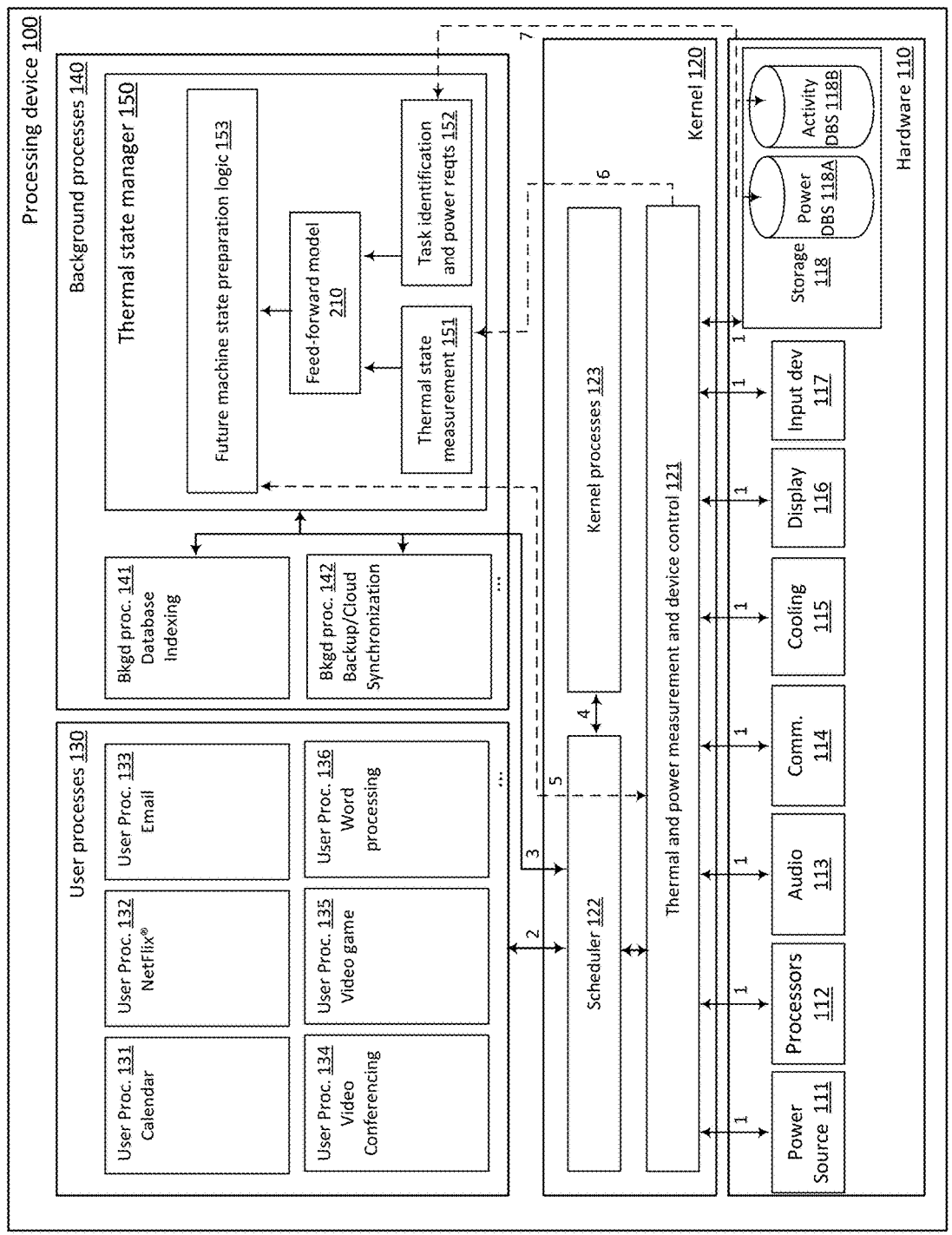
FIG. 1 illustrates, in block form, system components of a processing system that can perform machine state preparation for a future processing task

FIG. 1 illustrates, in block form, system components of a processing device 100 that can perform a process for preparing the processing device for a future operating system of a future processing task.

A processing device can include hardware 110, an operating system kernel 120, user processes 130, and background processes 140. Kernel 120 can communicate with hardware 110 via communication channel(s) 1. Kernel 120 can communication with user processes 130 over communication channel(s) 2, and with background processes 140 over communication channel(s) 3. Communication channel(s) 3 can implement communication 5 and 6 between components of thermal state manager 150 and thermal and power measurement and control 121 sub-system in kernel 120. Process management (or "scheduler") 122 can communicate with kernel processes 123 via communication channel 4. Communication channel(s) 7 can be implemented between storage 118 and task identification and power requirements module 152 via communication channels 1 and 3. Communication channels can be implemented using inter-process communication methods such as messaging, sockets, and shared memory and via hardware channels such as an I/O bus or I/O interface hardware coupled to an I/O bus.

Hardware 110 can include power source 111, processors 112, audio components 113, communication components 114, cooling components 115, display 116, input device(s) 117, and storage 118. Power source 111 can include one or more batteries, a capacitor array, a charging/wall power sub-system, or solar panels. Processors 112 can include a central processing unit (CPU), a graphics processing unit (GPU), a digital signal processor (DSP), a math co-processor, programmable gate arrays, or microcontrollers. Audio 113 components can include one or more encoder/decoders (codecs), an audio amplifier, one or more analog-to-digital converters (ADC) and one or more digital-to-analog converters (DAC), and a digital signal processor. Communications components 114 can include an Ethernet transceiver, a Wi-Fi transceiver, and cellular transceiver, one or more antennae, and a satellite transceiver (GPS). Cooling equipment can include one or more fans, finned heat exchangers, liquid-to-air heat exchangers, or thermo-electric coolers ("Peltier") coolers. A display 116 can include a cathode ray tube (CRT), liquid crystal display (LCD), a light-emitting diode (LED) plasma display, touch screen, or dot-matrix graphics display. Input devices 117 can include a keyboard, mouse, trackball, touch interface, et al. Storage 118 can include a hard disk, flash memory, static memory, dynamic memory, CD/DVD ROMs, or a read-only memory chip. As described in more detail below, storage can include a power usage database 118A and a processing task history 118B (or "activity") database. Other than passive finned heat exchangers, each of these hardware 110 components can consume power and generate heat, and generate noise that the user may hear during a cooling process.

Kernel 120 can include a thermal and power measurement and device control module 121, a process manager 122 (or "scheduler"), and one or more kernel processes 123. Thermal and power measurement and device control module 121 ("control module") can measure the current temperature of one or more of the hardware components 110 and also measure the internal temperature of the air inside processor device 100 at one or more points. Control module 121 can also control operation of the individual components of hardware 110. Communication 1 between the control module 121 and hardware 110 can be via an input/output (I/O) bus. Process manager 122 can include scheduling logic that controls the priority and execution of user processes 130, background processes 140, and kernel processes 123.

User processes 130 can include applications such as calendar application 131, video playback applications such as Netflix® or YouTube® 132, email application 133, video conferencing application 134, one or more video games 135, or word processing application 136 such as Apple® Pages or Microsoft® Word, and other applications. Each application can run as a process in user processes 130. Each application can also have one or more threads of execution such as get email, send email, spell-check document, pause movie, begin video conference, or schedule a calendar event. Each thread of execution of a user process 130 can utilize one or more hardware 110 components, each of which can consume power and generate heat.

Background processes 140 can include database indexing 141, such as background indexing of an Apple Spotlight® database, cloud services such as scheduled or automated backup or synchronization 142, a thermal state manager 150, printing (not shown), and other background processes. Thermal state manager 150 can alternatively be implemented as a user process 130 or a kernel process 123.

Thermal state manager 150 can include thermal state measurement module 151, processing task identification and power requirements module 152, feed-forward thermal prediction model 210, and future machine state preparation logic 153. Thermal state measurement module 151 can communicate with thermal and power measurement and device control module 121 in kernel 120 via communications channel 6. Thermal state measurement module 151 can receive one or more temperature readings from one or more hardware components 110 and process the received temperature readings to determine an overall thermal machine state of processing device 100. Alternatively, thermal state measurement 151 can maintain a buffer (not shown) of sequential sets of one or more temperature readings for finely detailed temperature control algorithms. For example, it may be clear from a priority of one or more threads of a game process 135, display of data on display 116, and the temperature readings of a graphics processor 112 and audio components 113 that the user is playing a graphics-intensive video game. If a user has an upcoming video conference 134 in an hour, then future machine state preparation logic 153 may slowly ramp up cooling components 115, begin reducing the clock rate of processor 112, reduce bass elements in the audio 113, or reduce display resolution or brightness in preparation for the power and heat requirements of the upcoming video conference 134. Additional details of the thermal state manager 150 are discussed below.

Figure 2A:
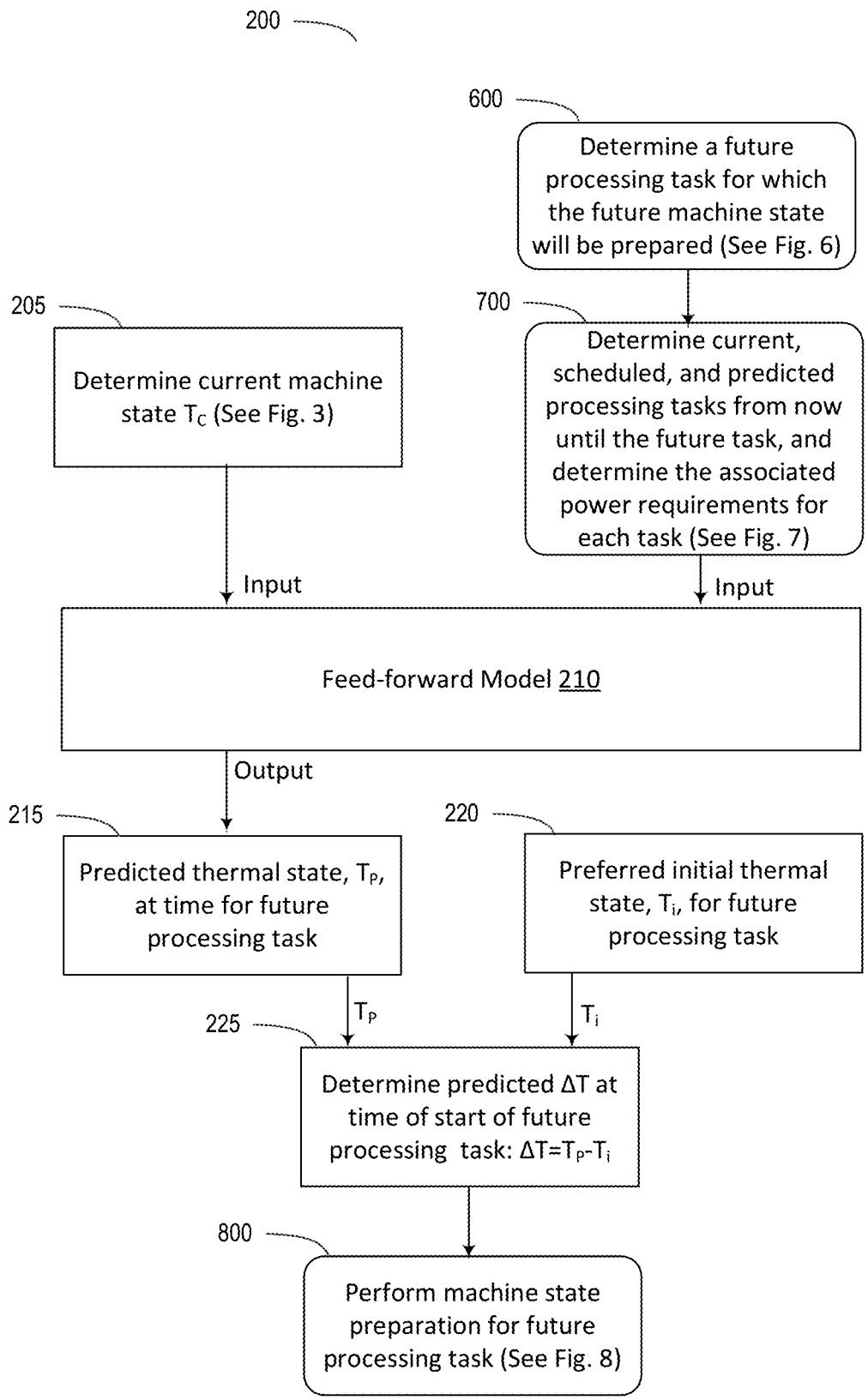
FIG. 2A illustrates, in block form, an overview of method of preparing a state of a processing device for a future processing task.
Figure 2B:
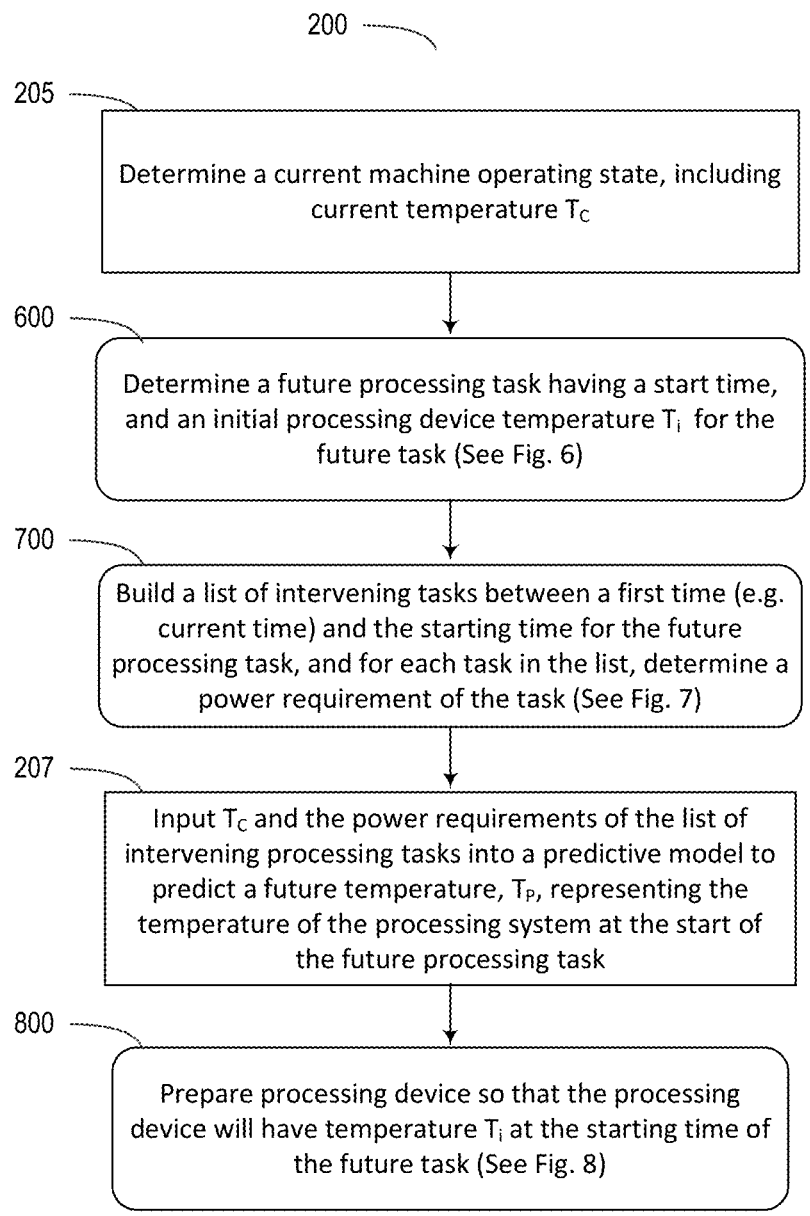
FIG. 2B illustrates a flow chart of a method for preparing a state of a processing device for a future processing task.

FIG. 2A illustrates, in block form, an overview of the flow of a method 200 of preparing a state of a processing device 100 for a future processing task. FIG. 2B illustrates a more detailed flow diagram of a method 200 of preparing a processing device 100 for an initial future state for starting a future processing task.

In operation 205, a current machine state of processing device 100 is determined. As shown in FIG. 3, below, the current machine state can be as simple as a single temperature measurement 305, parameter 2, of processing device 100. In addition, a simple operating state of the processing device can include a power consumption metric 305, parameter 1, over a specified increment of time, $\Delta t$, such as 0.05 W over 100 ms. Further details of a machine state 300 of processing device 100 are discussed below with reference to FIG. 3.

Current machine state 205 temperature $T_C$ is an input to feed-forward thermal prediction model 210. Additional inputs to feed-forward prediction model 210 are a start time of a future processing task 600 having an initial processing device temperature $T_i$ for the future task and a list of predicted intervening processing tasks 700, and their associated power usages, between a first predetermined time (e.g. the current time) and the time for starting the future processing task. Operation 700 is described in further detail with reference to FIG. 7, below. The output of the feed-forward model 210 is a predicted thermal state 215 $T_P$ of the processing device 100 at the time that the future processing task is to start. This predicted future thermal state $T_P$ is compared to an initial future state 220 $T_i$ of processing device 100 at the time that the future processing task is to start, to determine whether heat needs to be removed from the processing device 100 before the future task is started. Feed-forward prediction model 210 can be implemented using a simulated resistance-capacitance (RC) network. The RC network can be simulated using differential equations, a MatLab® runtime module, or other computational module.

In operation 600, the future processing task can be identified and selected. A time for starting the future processing task can be determined. A future initial state $T_i$ of the processing device 100 can also be determined for when the future processing task is to start. For example, the future processing task may be a one-hour long video conference 134. The user may hold video conference 134 over a Wi-Fi connection at the highest video and audio resolution supported by the Wi-Fi connection, and at a fairly high audio volume. Each of these factors can contribute to the power consumed during the video conference 134, and therefore the heat generated during video conference 134. Operation 600 is described in further detail with reference to FIG. 6, below.

In operation 207, current machine state TC and the list of predicted processing tasks and associated power requirements determined from operation 700 can be input into feed-forward prediction model 210.

In operation 215, a future predicted thermal state $T_P$ can be output from feed-forward prediction model 210, based upon the input current machine state $T_C$ and list of processing tasks and associated power consumption values determined in operation 700 for intervening processing tasks between the predetermined time (e.g. current time) and the starting time of the future task.

In operation 220, a future initial state $T_i$ of the processing device 100 at the time that the future task can be predicted to start is determined from the power estimated to be consumed and heat generated by the user's choices for the future predicted task, e.g. video conference 134 call (Wi-Fi connection, highest video and audio resolution, and loud video). $T_i$ can be selected such that the user experience during video conference call 134 need not be compromised to reduce heat. For example, the preferred initial future state $T_i$ of the processing device 100 can be chosen so that cooling fans 115 do not come on at full speed in the middle of the one-hour long video conference call 134.

In operation 225, a temperature difference $\Delta T$ can be determined from the future predicted thermal state $T_P$ obtained from the feed-forward model 210, and the future initial state $T_i$ for the processing device 100 before the future processing task is to start.

Figure 8:
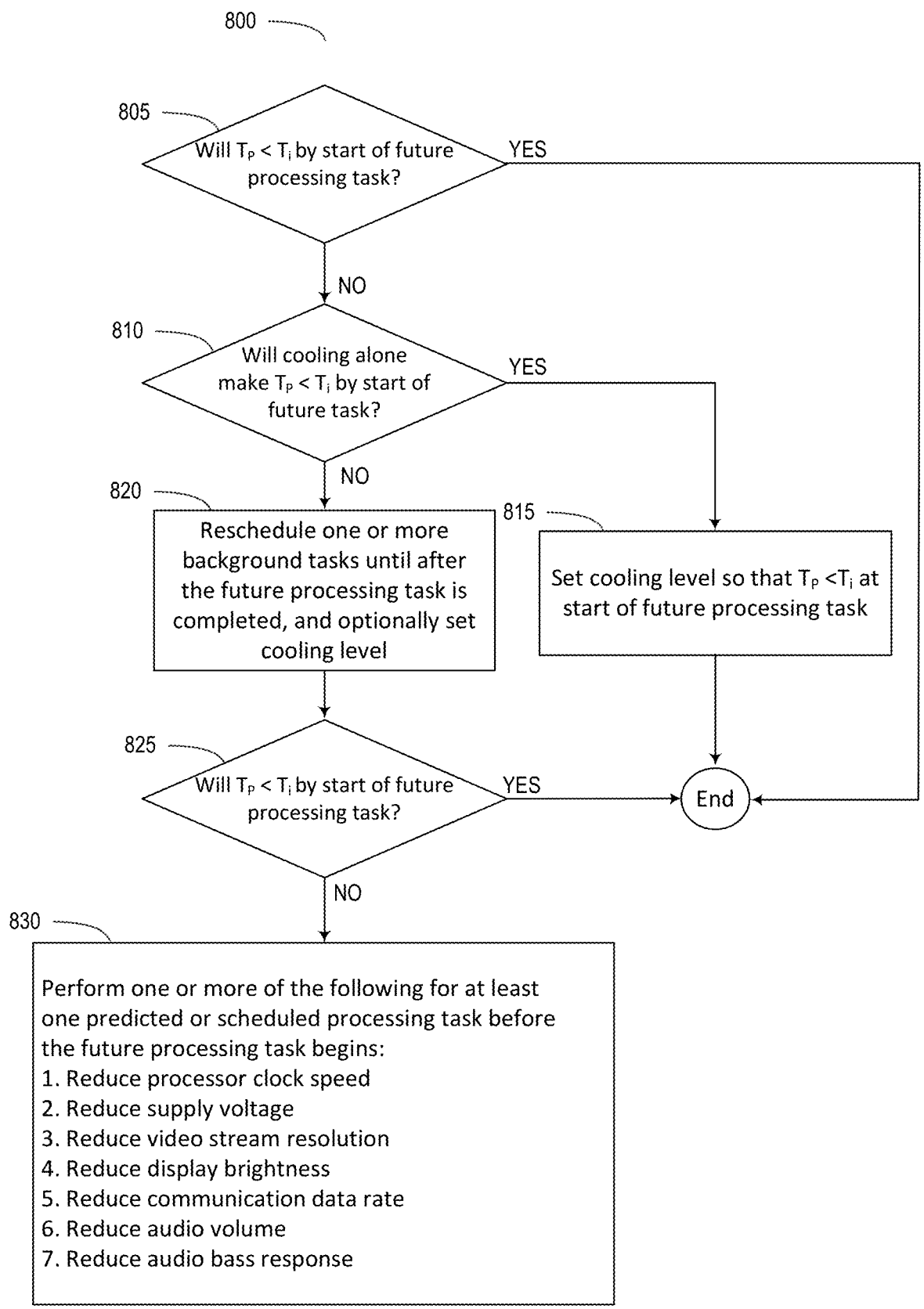
FIG. 8 illustrates a flow chart of a method of preparing a processing device for a future processing task, according to some embodiments.

If the temperature difference $\Delta T$ determined in operation 225 indicates that heat removal is required to achieve the future initial state $T_i$, then in operation 800 processing device 100 can be prepared for the future processing task as described more fully with reference to FIG. 8.

FIG. 3 illustrates example attributes of a machine state 300 of processing device 100. A machine state, or just "state," of processing device 100 is a snapshot of a state of the processing device 100 at a point in time. A machine state record can have a timestamp (not shown). At a minimum, the snapshot can include a single temperature value representing a current temperature of the processing device 100. The single temperature value can be used as current machine state $T_C$ for method 200, described above with reference to FIG. 2.

Machine state 300 can further include parameters for individual components of processing device 100, such as CPU 310, GPU 310, et al. Each component can have one or more parameters representing a current state 300 of processing device 100.

Machine state 300 can include storing a current clock rate and/or measured temperature for each of CPU 310 and GPU 315. A current clock rate can be used to estimate an amount of power consumed by CPU 310 and/or GPU 315 for an increment of time. The power consumption value can be multiplied by a duration of time to obtain an amount of power consumed CPU 310 and/or GPU 315 for the duration of time.

Machine state 300 can further include storing a power consumption rate, measured in Watts per unit of time, $\Delta t$, and/or a measured temperature for one or more components such as audio system 320, network 330, cell signal 335, display 340, or storage 345. A power consumption value attributable to a particular component can be multiplied by a duration of a processing task to determine a power usage for the duration for the particular component. Machine state 300 can further include a signal quality parameter for some components, such as network 330, cell signal 335, or Wi-Fi signal 325 as shown in parameter 3 (304) for Wi-Fi 325, network 330, and cell signal 335.

A machine state 300 that includes a signal quality parameter for a component can be correlated with a user process 130 that uses the component to predict a future user behavior in relation to the user process 130. For example, a user may typically hold a video conference call 134 using a strong Wi-Fi signal, such as in one's home, while a cell signal strength may be low, and processing device 100 may not be connected to a network at all (thus, having no signal quality for the network). From this state information, it may be predicted that a user will hold a scheduled video conference call 134 at home, using Wi-Fi, and not require any cell signal or network connection. Thus, cellular and network subsystems, other than Wi-Fi, could be shut off during the video conference call 134 to save power and reduce heat. Similarly, a user may typically play a high-performance video game 135 only when connected to a network, and thus a Wi-Fi subsystem could be turned off to save power and reduce heat.

Machine state 300 can further include binary state information, such as a whether a battery 350 is charging, whether a user is at home 375, whether processing device 100 is currently in motion 375, or whether processing device 100 is in a standby mode, or in a run state. Binary state information can be correlated with a user process 130 predict future user behavior and power consumption. For example, a user may typically issue a query for restaurants at 11:30 a.m. at a time when machine state 300 indicates that the user is not at home 370, is in motion 375, walking, and battery 350 is not charging. It may be predicted that a user selects a restaurant when she is walking to lunch, thus the device is not charging. Accordingly, during the query, it can be predicted that no heat will be generated due to power consumed by a battery charger. It may further be predicted that a user does not require a network connection (e.g. Ethernet cable and port), thus the Ethernet subsystem may be turned off to reduce heat. However, it may also be predicted that the user may use Wi-Fi or cellular communication to complete the search query. Thus, power consumed by Wi-Fi and cellular subsystems must be taken in account when predicting power usage for the processing task for the query.

Machine state 300 can further include a parameter for a level of one or more components, such as battery level 355, light detection 360, sound detection 360, or supply voltage level 385. Machine state 300 including such levels can be correlated with power usage by components such as display brightness 340, audio volume 320, or battery charging 350 to predict future power usage. For example, if light detection 360 detects a high level of ambient light, such as daylight, and a user process 130 indicates that a user is querying for restaurants at lunch time, while in motion 375, it may be predicted that display power consumption will be increased to allow the user to see the display in bright ambient light. Similarly, if sound detection (microphone) 365 detects high ambient noise, such as street construction or crowd noise, when a user process 130 indicates the user is listening to audio 320, it may be predicted that audio power consumption will be increased to allow the user to hear the audio over the high ambient noise. In another example, if machine state 300 detects that a user is at home 370, and battery charge level 355 is below a threshold percentage, it can be predicted that the user will charge the battery 350 while at home. If the charge rate 350, parameter 3, is lower than a charge rate for a plug-in wall charger, and motion detection 375 indicates that a user is driving, then it may be predicted that a user is charging using a lower amperage portable charger such as in a car. Accordingly, power usage and heat due to charging the battery in an automobile can be predicted.

Machine state 300 can also include information obtained from an application, such as a weather application, or obtained from an internet browser viewing a weather web page. A current state of weather 390, such as rain, wind, and temperature forecast could be included in a machine state record 300.

FIG. 4 illustrates example records 400 and attributes of a power usage database. A power usage database contains records that represent measured or estimated power usage by one or more hardware components and one or more processing tasks. Power usage records 400 can be used to predict the amount of power used by a one or more hardware components 100 or processing tasks, and therefore the amount of heat generated by the one or more hardware components 110 and/or processing tasks.

A processing device 100 can include an initial ("seed") database of power usage records 400 that is available on the processing device 100 before the user powers on the processing device 100 for the first time. As the user uses the processing device, more power usage database records 400 are generated that represent the user's actual usage of the processing device 100. Task identification and power requirements logic 152 in thermal state manager 150 can apply a weighting factor to power usage records 400 based on a user's actual usage vs. power usage records 400 included with the processing device 100. In an embodiment, the longer the user uses the processing device 100, the more the weighting factor favors power usage records 400 generated by the user's usage of the processing device 100. In an embodiment, the initial database of power usage records 400 can be updated, e.g., during an Operating System process or other updating process. Generating of both types of power usage records 400 are described more fully below in FIGS. 9A and 9B.

A power usage database 400 can be used to predict power usage for a wide variety of processing tasks and power usage for particular hardware subsystems. Each power usage record 410 through 475, e.g., can have an identifier 401, a process or device description 402, a power consumption time increment Δt (403), an amount of power consumed during the time increment 404, and one or more parameters 405 and parameter values 406. One or more power usage records can be used to predict the amount of power consumed over a period of time of execution of one or more user processes 130, background processes 140, and/or kernel processes 123, or one or more hardware components 110 in processing device 100. An identifier 401 can be any unique identifier for a database record. In an embodiment, power usage record identifier 401 can use an encoding scheme such as a high bit being zero means that the power usage record relates to a hardware component and that a high bit being one means that the power usage record relates to a user process, such as user processes 130. In an embodiment, a power usage record can have a field indicating a power usage record type (not shown), such as hardware, kernel process, background process, user process, or thread of a user process. A time increment, Δt, for a power usage record can be any meaningful time increment for the power usage record. For example, power used by cooling fans may not change very quickly and thus a time increment, e.g. 100 ms, may be appropriate for measuring power consumed by cooling fans, but not for a processor which may change clock speed quickly. In an embodiment, for a power usage record 400, the time increment can be determined in relation to the amount of power consumed during the time increment, such that the resolution of the power measurement has sufficient granularity over the time increment to be representative of the power usage being measured. For example, a power measurement may be able to be made at 1 milliwatt resolution, and thus a time increment for a main processor can be selected to be long enough, e.g. 25 ms, to achieve a power measurement in 0.01 of a watt, to utilize the 1 milliwatt resolution.

A main processor 410, or CPU, may consume 0.02 watts over a time increment of 25 ms when the CPU is operated at a clock rate of 2.2 GHz. Cooling fans 415, can be run at a variable duty cycle. For example, cooling fans 415, when run at 5% of full speed, may consume 0.08 watts over 100 ms. A graphics processor 420, or GPU, may consume 0.01 W when operated at 2.0 GHz for 25 ms. A power converter module, 425, such as a battery charger, may consume 0.05 watts over 100 ms of operation. An audio codec 430 may consume 0.01 watts over 100 ms. An audio amplifier may consume 0.05 watts over 100 ms when operated at a specified output level (parameter 405), such as 20%. A hard disk 440 may consume 0.06 watts over 100 ms when operated at full spin speed.

Specific processes can also have power usage records 400. A kernel process 445 power usage record, such as for a kernel process 123 of FIG. 1, may indicate that the kernel process consumes 0.001 watts over 25 ms. The kernel process may have a high, or the highest, processor scheduling priority such as 0xFF. A scheduler process 450 power usage record, such as for process manager 122, may indicate that the schedule process consumes 0.001 watts over 25 ms. A scheduler process may have a high processor scheduling priority such as 0xFE. A system idle process 455 power usage record may indicate that a system idle process consumes 0.002 watts of power over 100 ms. A system idle process typically has a low, or the lowest, processor scheduling priority, such as 0x01.

A user process 130, such as an email application 133, a video conference application 134, or a video game application 135 can have a power usage record 460, 465, 470, or 475, respectively. Each power usage record can have a time increment for the power usage 403, a power usage amount 404, and a processing priority parameter 405 and a processing priority parameter value 406 for the user process. Each application process 130 can have a power usage database record for a particular thread, e.g. an email application can 135 can have a send mail thread having a power usage record 465. An application process for an audio application may have a thread for listening to music, that utilizes the audio amplifier and another thread for burning one or more songs to a CD-ROM that utilizes the CD-ROM storage device but does not utilize the audio amplifier. In an embodiment, a power usage record for a thread, e.g. email application, send mail thread 465, can represent power usage by one or more hardware components used in the execution of the thread for a time increment, Δt. In an embodiment, a power usage record for a process, e.g. email application 460, can represent an average power used for one or more threads of the process for a time increment, Δt, and can further include the average power usage by one or more hardware components 110 used in the execution of the one or more threads of the process. In another example, a video conference application 134 can have a power usage record 470 representing the power used by the application (0.002 watts) over a time increment of 25 ms, when the video conference application 134 is run at processing priority 0x50. A video game 135, e.g. Mortal Kombat®, may consume 0.003 watts over 25 ms when run at processing priority 0x60. An application, or a thread of an application, may have more than one power usage record with one or more of the record parameters differing. For example, if a user typically plays a video game 135 before a video conference 134, a method of preparing the future state of the processing device 100 for the video conference 134 may including reducing processing priority of the video game 135 from 0x50 to 0x40 to reduce power consumption and heat generation before the video conference 134. Accordingly, a power usage record may be stored for the video game at a processing priority of 0x50 and another power usage record stored for the video game at processing priority 0x40.

FIG. 5 illustrates example records 500 and attributes of a processing activity database. A method of generating a processing activities database is described below with reference to FIG. 10. A method of determining user behavior patterns from a processing activity database is described below with reference to FIG. 11.

Processing activity records 500 contain a history of a user's activity in interacting with processing device 100. Processing activity can include events (e.g. a mouse click, screen tap, button press, etc.), commands (e.g. File|Open, or a key sequence such as Command-Shift-Q) resulting from user inputs, and processes and threads launched in response to user inputs (collectively, and individually, "processing activity"). A processing activity database record, e.g. 500, can contain a timestamp 501 for the start of a particular processing activity, a duration 502 of the activity, a command or event name 503 for the activity, an application 504 launched in response to the command or event 503, and/or a thread 505 launched as a result of a command or event 503. Processing activity record 500 can further include an amount of power consumed 506 for the duration 502 of the activity. The amount of power 506 associated with a processing activity can be measured by thermal and power measurement and device control module 121 in kernel 120. In an embodiment, the amount of power associated with the processing activity can be computed from the duration of the activity multiplied by a power usage rate stored in a power usage record 400. In an embodiment, both the measured and computed power usage values for the activity can be stored (not shown) in a processing activity record 500. A processing activity record 500 can further include a reference 507 to a machine state record 300. Machine state records are described above, with reference to FIG. 3. A processing activity record, e.g. 530 or 535, can be correlated with a machine state record 300, referenced by a machine state record reference 507, to determine patterns in user behavior in interacting with processing device 100. In an embodiment, a machine state record 300 is generated and stored in relation to a processing activity record 500. In an embodiment, a processing activity record 500 can reference an existing, stored machine state record 300.

In an example, processing activity record 530 can represent the processing activity of launching NetFlix® in response to a click event 503. In this example, the NetFlix® application 504 is launched with thread 505. A machine state record 300, referenced by field 507, or processing activity record 530 can contain an indication of power usage by storage device 118 to retrieve executable images of the NetFlix® application for execution. Machine state record 300 referenced by field 507 of the processing activity record 530 may further indicate that the user sets display 340 resolution (parameter 3) at highest maximum resolution, and sets audio system 320 at the highest audio quality (parameter 3), which may consume more power than a reduced audio or video quality. Machine state record 300 may further indicate that the user connects to NetFlix® with a network connection 330 and not with Wi-Fi 325 or cellular signal 335. Example processing activity records 510 through 570 represent processing activities that are detected in response to a command or event 503. Processing activity records 500 may also be generated by learning patterns in processing activity over a period of time.

Processing activity records 500 for learned patterns of processing activity can be stored with the same, or fewer, attributes than processing activities records 500 stored in response to an event or command, or a process or thread. As described more fully below, with reference to FIG. 11, processing activity patterns can be learned by analyzing processing activity records 500. A processing activity record representing a learned pattern of a processing activity 575 can be that this user holds a one-hour long video conference every weekday at 9:00 a.m., with machine state characteristics as indicated in machine state record 0x00014785. In another example, a processing activity record of a learned behavior of processing activity 580 that on Friday nights at 8:00 p.m. this user plays a video game for an hour using about 12 watts of power. Similarly, an example processing activity record of a learned activity 585 can be that on weekdays, at 6:00 am this user spends 5 minutes on email using 0.10 watts of power.

Figure 6:
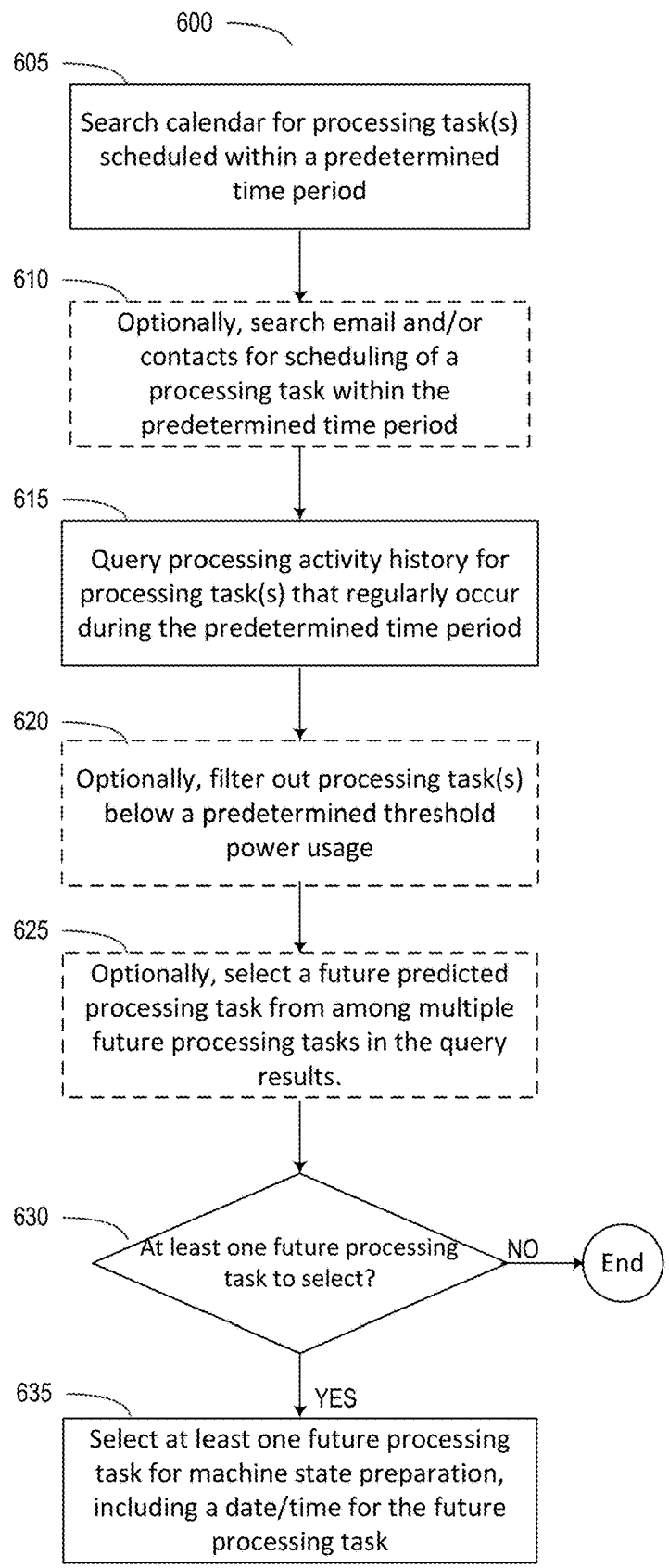
FIG. 6 illustrates flow chart for a method of determining a predicted or scheduled future processing task, according to some embodiments.

FIG. 6 illustrates flow chart for a method 600 of determining a predicted or scheduled future processing task, a start time for the processing task, and an initial state for starting the processing task.

In operation 605, a scheduled future task can be determined by searching a database of scheduled calendar activities. A calendar application, e.g. user process 131 as shown on FIG. 1, can include a list of one-time scheduled and recurring scheduled tasks. For example, calendar application 131 data may indicate that a user has a recurring video conference 134 every Monday morning at 9:00 a.m.

In operation 610, the method 600 can optionally search email data of email application 133, as shown on FIG. 1, for information regarding the scheduling of future processing task, e.g., a video telephone conference 134 this Monday morning at 9:00 a.m. in an email from the user's supervisor to all members of the supervisor's team. Operation 610 can also include searching a contacts data file of a contacts application for a notation of a future scheduled processing task. For example, a contact record may indicate that a user has scheduled watching a video on NetFlix® on this Friday night at 9:00 p.m. at her home with the contact.

In operation 615, method 600 can query processing activity database 500 to determine any processing tasks that regularly occur. For example, if the current day is Monday, a query may select processing activity history records 500 that started between 8:00 am and 10:00 a.m. on one or more past Mondays. In another example, a query may include a machine state related to selected processing activities, such as processing activities on a weekend day, between 10:00 a.m. and 11:00 a.m. that were performed when the machine state for the processing activities indicates that the user was not at home.

In operation 620, processing tasks whose power usage is lower than a predetermined threshold can be filtered out from the query results before determining a future predicted task.

In the event that multiple future events are returned from the query, in operation 625, method 600 can optionally select from the multiple future processing tasks to identify a predicted future task for which to prepare the machine state. In an embodiment, operation 625 can select a future predicted task with the highest power consumption from among the multiple future processing tasks in the query results. In an embodiment, operation 625 can select the future processing task that is longest duration from among the multiple future processing tasks in the query results. In an embodiment, operation 625 can select the future processing task with the highest priority from among the multiple future processing tasks in the query results. In yet another embodiment, operation 625 can select the future processing task with the most processing activity records 500 indicating a repeating pattern of user behavior, and thus a higher likelihood that the user will perform this predicted future task. In still another embodiment, operation 625 can select a future predicted processing task, from among the multiple future predicted processing tasks, having a machine state that is most similar to the current machine state. For example, the current machine state may indicate that the user is at home (machine state attribute 370) and charging processing device 100 (machine state attribute 350, parameter 3, high charging rate), and the processing device 100 is coupled to a network (machine state attribute 330). This machine state may correlate most closely to a future processing task of a video conference 134, which the user has previously performed approximately within the query time window, while the user is at home, connected to a network, and charging the processing device 100.

In operation 630, it is determined whether there is at least one future processing task from which to select a future predicted processing task for which the future machine state is to be prepared. If so, then in operation 635 one or more processing tasks are selected for preparing the future machine state to perform the one or more future predicted processing tasks. Otherwise, method 600 ends.

If, in operation 600, at least one future processing task was selected ("selected future processing task"), for which a future machine state is to be prepared for processing device 100, then the amount of energy consumed and heat generated by processing tasks between a first time, e.g. the current time, and the start time for the selected future processing task ("intervening processing tasks") can affect the future machine state at the start time of the selected future processing task. Thus, to prepare the machine state for the selected future processing tasks, the power consumption and heat generated by intervening tasks may need to be determined.

Figure 7:
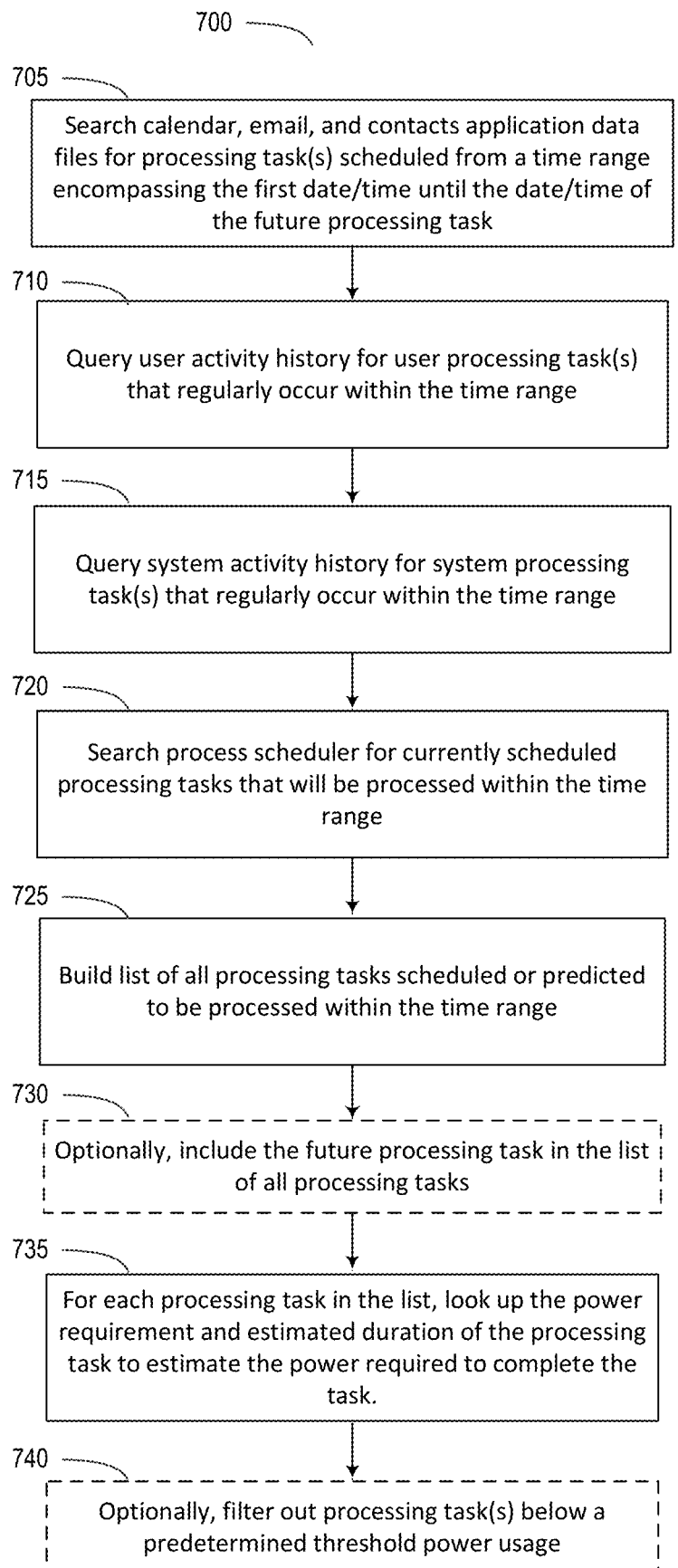
FIG. 7 illustrates a flow chart of a method of determining intervening predicted or scheduled processing tasks from a predetermined time up until the future processing task.

FIG. 7 illustrates a flow chart of a method 700 of determining predicted or scheduled processing tasks ("intervening processing tasks") from a first time, e.g. the current time, up until a start time for a future predicted or scheduled processing task ("future processing task"). In an embodiment, the first time can be a time that is a predetermined amount of time prior to the start time of the future processing task. The heat generated from the power consumed by the intervening tasks may need to be mitigated to prepare the processing device 100 machine state for the future processing task. For example, if a user plays a video game (intervening processing task) before a video conference (future processing task), and the video game requires substantial CPU and GPU performance and a high audio volume for an hour, then processing device 100 may have a substantial heat build-up that needs to be dissipated before the video conference. By building a list of intervening processing tasks, and determining the power requirements and heat generation associated with each processing task, processing device 100 can take early action to mitigate heat build-up before the start of the selected future processing task.

In operation 705, one or more calendar, email, or contacts application data files can be searched for processing tasks that may have been scheduled using one or more calendar, email, or contacts applications, respectively. For example, a user's work email may contain a calendar entry for a scheduled video conference that begins at 9:00 a.m. on Monday and is scheduled to last for one hour. The user's personal calendar may contain a scheduled task for Friday night at 8:00 p.m. to play a multi-user video game using high-resolution graphics, an internet connection and a sound system. A contacts entry may contain a textual note that the user has a scheduled appointment to watch a movie with a friend on Saturday at 8:00 p.m. using an application on her processing device 100 such as NetFlix® or Hulu®. Scheduled processing tasks can be added to a list of intervening processing tasks between a first time and the future start time for the selected future processing task. In an embodiment, the first time can be the current time. In an embodiment, the first time can be a predetermined amount of time before the start time of the selected future processing task. In another embodiment, the first time can be a specified time before the start time of the selected future processing task.

In operation 710, processing device 100 can query a history of user processing activities (e.g. user process 130) for processing tasks that have historically been performed during a window of time. In an embodiment, the query can be limited to a specified time range that encompasses the first time and the start time for the selected future processing task. In an embodiment, the first time can be the current time. Alternatively the first time can be a predetermined amount of time before the start time for the selected future processing task. In an embodiment, a processing task can be selected from the query results for inclusion in the list of intervening processing tasks if the processing task has twice occurred within the range of time encompassing the first time and the start time of the selected future processing task. A task can be selected for inclusion in the list of intervening processing tasks if the processing task has twice occurred on the same day of the week, within the range of time encompassing the first time and the start time for the selected future task. In an embodiment, the query can include learned pattern records, such as records 575 through 590 of FIG. 5, described above. In an embodiment, the query can encompass the specified time range for one or more days preceding a current day. In an embodiment, the one or more days can be limited to one or more specific days of the week. In an embodiment, the one or more days can be limited to weekdays, or limited to weekends. In an embodiment, the one or more days can include, or exclude, holidays.

In operation 715, processing device 100 can query a history of system processing activities (e.g. background processes 140 history or kernel processes 123) for processing tasks that have historically been performed at a specified window of time. Time and/or day limitations can be applied to the query as in operations 705 and 710.

In operation 720, processing device 100 can query currently scheduled processing tasks, e.g. processes in a process scheduling queue such as in scheduler 122. Time and/or day limitations can be applied to the query as in operation 710.

In operation 725, a list of intervening processing tasks identified within operations 705, 710, 715, and 720 can be generated for the range of time encompassing the first time and the start time of the future processing task.

In operation 730, the list of intervening tasks can optionally include the selected future processing task.

In operation 735, for each processing task in the list of intervening processing tasks, a power requirement for performing the processing task can be determined. Power usage for a processing task can be determined by summing the power consumed by one or more resources (e.g. CPU, GPU, memory, storage, network, Wi-Fi, audio et al.) that are used in executing the processing task. Power usage data for hardware components 110 is described above regarding power usage records 400 with reference to FIG. 4. In an embodiment, power usage for a processing task can be determined from an increment of power used by the processing task, as shown in e.g. email application power usage record 460 of FIG. 4, and increment can be multiplied by the duration of the processing task. In another embodiment, power usage for a processing task can be determined from processing activity records 500 as described above with reference to FIG. 5.

In operation 740, the list of intervening tasks can optionally be filtered to exclude processing tasks having a power usage amount that is less than a predetermined power usage. Excluding processing tasks having de minimus power usage can simplify the processing needed to determine the amount of heat generated and amount of heat to dissipate from processing device 100 before the start time for the selected future processing task.

The list of intervening processing tasks and associated power consumption values can be input into a feed-forward thermal prediction model 210, along with the current machine state $T_C$ of the processing device 100. Feed-forward prediction model 210 can output a predicted thermal state $T_P$ at the time for the start of the selected future processing task. The future selected task has an associated initial thermal state, $T_i$, that is a preferred state for beginning the selected future processing task. For example, if the selected future processing task is a one-hour long video conference, then a preferred initial state $T_i$ for the processing device 100 at the start of the video conference may be a thermal state such that the cooling fans do not come on at full speed during the video conference. If $T_P$ is greater than $T_i$ then preparatory operations may need to be performed to achieve thermal state $T_i$ by the time that, e.g., the video conference starts. Preparatory operations can include reduction in generation of heat and mitigation of heat generated.

FIG. 8 illustrates a flow chart of a method 800 of preparing a processing device 100 for a selected future processing task, according to some embodiments. Method 800 can be implemented in a background process 140, such as thermal state manager 150. In an embodiment, thermal state manager 150 can be implemented as a kernel process 123 or within thermal and power measurement and device control 121. In another embodiment, thermal state manager 150 can be implemented as a user process 130.

In operation 805, it is determined whether the predicted thermal state $T_P$ at the time for starting the selected future processing task is less than the initial thermal state $T_i$ for starting the future processing task. $T_P$ is based upon the list of intervening tasks and associated power consumption, as shown in method 700 of FIG. 7, above. If $T_P$ is less than $T_i$ then no preparatory operations should be needed before the start of the selected future processing task, and method 800 ends.

If, in operation 805, it is determined that the predicted thermal state $T_P$ at the time for starting the selected future processing task is greater than the initial thermal state $T_i$ for starting the selected future processing task, then in operation 810 it is determined whether cooling, alone, will reduce $T_P$ below $T_i$ by the start of the future processing task. This can be accomplished by determining the amount of heat that needs to be removed from processing device 100 to achieve future initial thermal state $T_i$ and determining whether the cooling rate of the cooling equipment 115 (fans, cooling fins, thermo-electric cooler, liquid cooling, etc.) is sufficient to remove the determined amount of heat within the amount of time available before the start of the selected future processing task.

If cooling alone will achieve thermal state $T_i$ before the start of the selected future task, then in operation 815, thermal and power measurement and device control module 121 can set the cooling hardware 115 to remove the determined amount of heat before the start of the selected future processing task, and method 800 ends. In an embodiment, cooling hardware 115 is set at a constant cooling rate up until the start of the future processing task. In another embodiment, a cooling profile is used to set the cooling rate for cooling hardware 115. A cooling profile can include a ramp up of the cooling rate to a predetermined threshold rate, following by a ramp down of the cooling rate to a cooling rate to be used at the start time for the future processing task. A cooling profile can further include a ramp up to a predetermined cooling rate, following by a period of a constant cooling rate, following by a ramp down to a cooling rate to be used at the start time for the future processing task.

If, in operation 810, it is determined that cooling hardware 115 alone will not achieve thermal state $T_i$ by the start of the selected future processing task, then one or more heat mitigation techniques can be employed. In operation 820, heat mitigation techniques can include rescheduling one or more background tasks 140 until after the selected future processing task has completed. The rescheduling can be accomplished by thermal state manager 150 requesting that the scheduler reduce heat generated by background processing tasks 140 and the scheduler 122 determining which background processing task(s) to reschedule. In an embodiment, thermal state manager 150 can be a kernel process 123 and can communicate with kernel 120 and scheduler 122 to determine which process(es) should be rescheduled to mitigate generation of heat. In addition, in an embodiment, thermal state manger 150 can instruct thermal and power measurement and device control module 121 to set a level for cooling hardware 115 that will mitigate heat in conjunction with rescheduling of background processing tasks 140.

In operation 825, it can be determined whether rescheduling background tasks and, optionally, setting a cooling rate for cooling hardware 115 in operation 815 and 820 will reduce the predicted future state $T_P$ below the future initial state $T_i$ for starting the future processing task. If so, then method 800 ends, otherwise method 800 continues at operation 830.

In operation 830, one or more heat mitigation techniques can be employed to reduce $T_P$ below $T_i$. In an embodiment, in addition to rescheduling background task(s) 140 and reducing heat with cooling equipment 115, processing device 100 can employ one or more of the following heat mitigation techniques: reducing processor clock speed for one or more processing tasks, reducing supply voltage to processing device 100, reducing video stream resolution, reducing display brightness, reducing a communications data rate, reducing audio volume, reducing bass response in an audio subsystem, or any combination of these. In an embodiment, one or more heat mitigation techniques are applied in a smooth and continuous manner such that a user perceives a generally consistent manner of operation and consistent level of performance during the heat mitigation operations. In an embodiment, one or more of the heat mitigation techniques can be user configurable. For example, a user may be able to configure an order of applications or threads for which scheduler 122 may reduce priority, reschedule, or reduce processor clock rate processor. For example, a user may be able to configure a video conference application to use a reduced video resolution in response to detecting that network bandwidth quality has degraded.

Figure 9A:
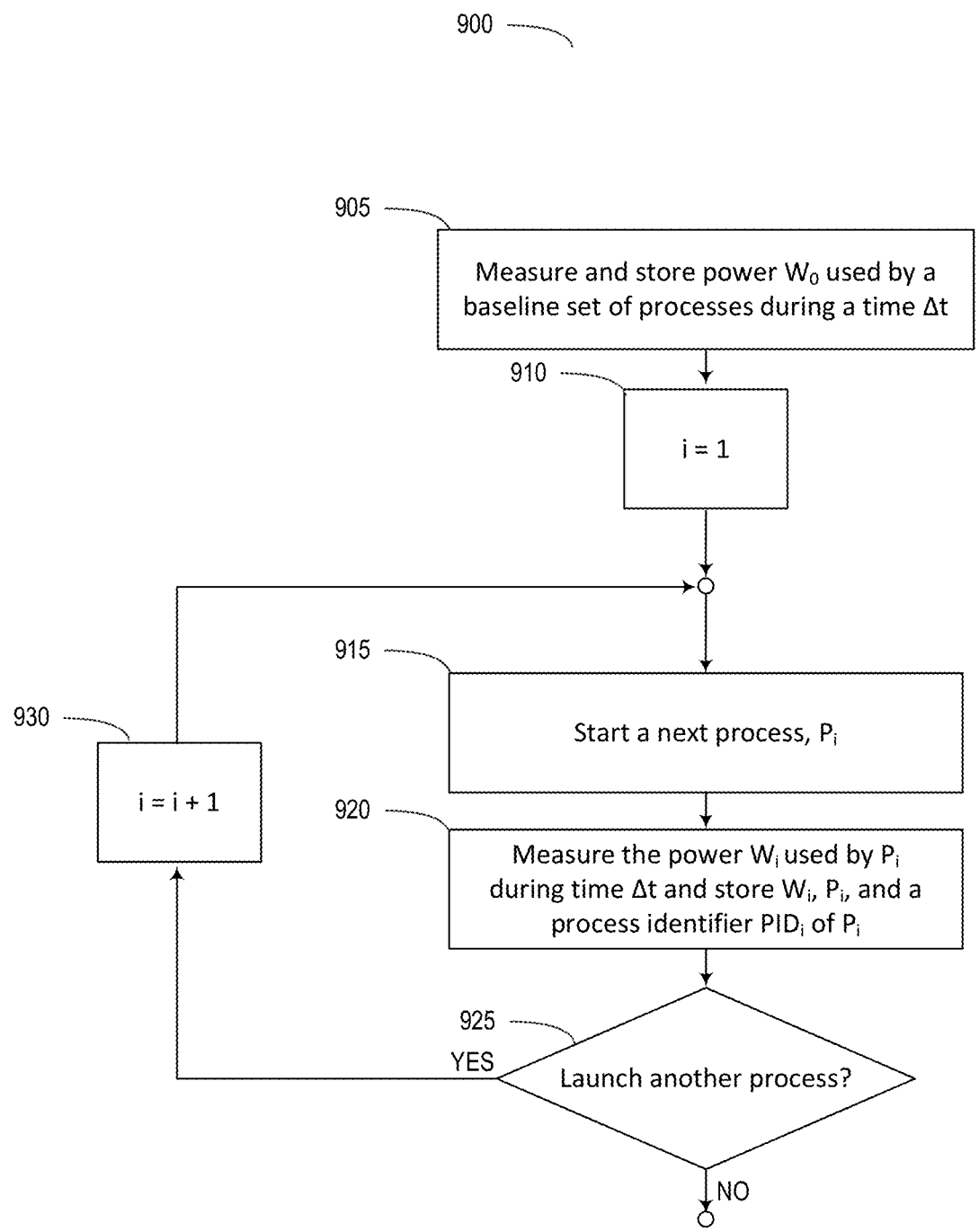
FIG. 9A illustrates a flow chart of a method of a generating an initial "seed" database of power usage for processing tasks, according to some embodiments.

FIG. 9A illustrates a flow chart of a method 900 of a generating an initial "seed" database of power usage 400 records for processing tasks. Processing device 100 may include an initial database of power usage records 400 for processing tasks, and further include a database 400 of additional power usage information that is generated as a user uses the processing device 100. In an embodiment, as additional power usage information is generated by usage of processing device 100, a weighting factor can give more weight to the power usage information generated by the user's usage of processing device 100.

In operation 905, processing device 100 can measure and store an initial power usage level $W_0$ that represents a baseline set of processing tasks during a time increment, $\Delta t$. Power usage can be measured by thermal and power measurement and device control module 121. The baseline set of processing tasks may include only those kernel processes 123 that are necessary to render the processing device 100 operable. The rate, $W_0/\Delta t$ represents a power consumption rate for the baseline set of processing tasks and may further include hardware components 110 necessary to run the baseline set of processing tasks.

In operation 910, a counter, i, is initialized to 1.

In operation 915, a next process, $P_i$, is launched.

In operation 920, an incremental power usage $W_i$, above $W_0$, for time increment $\Delta t$, is measured. A process identifier, $PID_i$ and optionally a process description can be generated and stored with $W_i$ and $\Delta t$ in a power usage database record 400.

In operation 925, it is determined whether there are any more processes to launch. If not, then method 900 ends. Otherwise, process 900 continues at operation 930.

In operation 930, counter i is incremented, and the method resumes at operation 915.

Figure 9B:
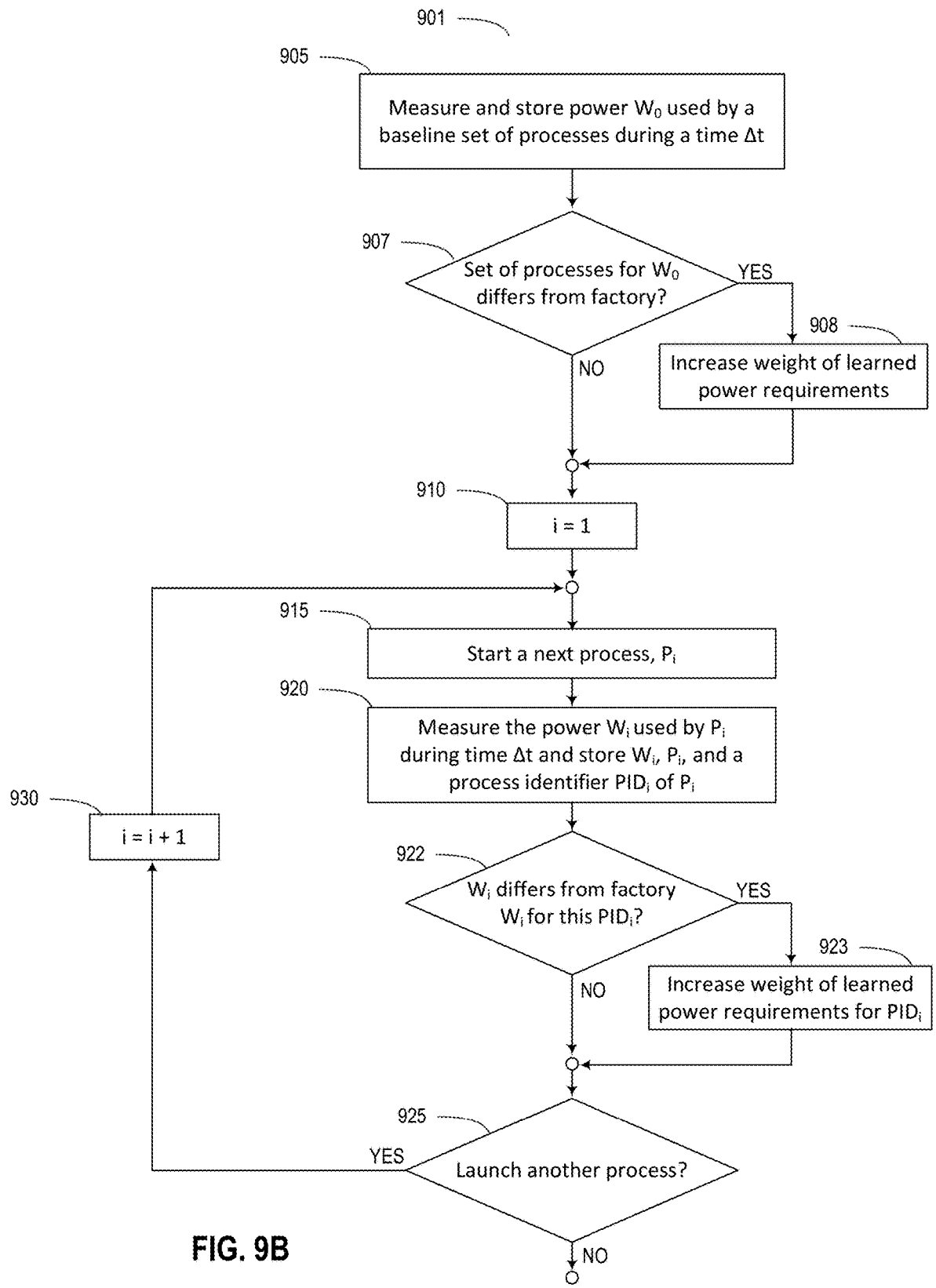
FIG. 9B illustrates a flow chart of a method of generating a history of power usage for processing tasks for a particular user and device, according to some embodiments.

FIG. 9B illustrates a flow chart of a method 901 of generating a history of power usage records 400 for processing tasks for during usage of processing device 100. In contrast, FIG. 9A describes building an initial "seed" database of power usage records 400, before a particular user receives and uses the processing device 100.

As described with reference to FIG. 9A, above, operation 905 measures and stores power usage $W_0$ for a baseline set of processing tasks during a time increment $\Delta t$. The baseline set of processes may be the initial processes that are launched during powering on of processing device 100. Note that the baseline set of processing tasks in FIG. 9A may differ from the baseline set of processing tasks here in FIG. 9B. For example, the factory or initial "seed" power usage for a baseline set of processing tasks may have been for an earlier version of an operating system than the current version of the operating system being used on processing device 100. Thus, over time, determining power usage for a processing tasks on processing device 100 may involve weighting actual learned power values, $W_i$, in accordance with FIG. 9B, more heavily than factory-generated power usage values learned in FIG. 9A.

In operation 907, it is determined whether the baseline set of processing tasks for $W_0$ differs from the factory set of baseline processes learned in FIG. 9A method 900. If so, then in operation 908, the weight of significance of the power usage for the baselines set of processing tasks of measured in operation 905 of FIG. 9B is increased over the $W_0$ for the baseline set of processing tasks in the initial "seed" database of power usage records in operation 905 of FIG. 9A. Method 901 continues at operation 910.

In operation 910, a counter i can be initialized to 1. In an embodiment, a different initialization value is used.

In operation 915, a next process $P_i$ can be launched.

In operation 920, the incremental power usage $W_i$, above $W_0$, for time increment $\Delta t$ can be measured. Power usage can be measured by thermal and power measurement and device control module 121. A process identifier, $PID_i$ and optionally a process description can be generated and stored with $W_i$ and $\Delta t$ in a power usage database record 400.

In operation 922, it can be determined whether $W_i$ differs from the factory $W_i$ in the initial "seed" database generated in method 900 of FIG. 9A for a processing task having a same $PID_i$. If so, in operation 923 a weight of $W_i$ for this $PID_i$ can be increased so that this $W_i$ learned by usage of processing device 100 is favored over the initial "seed" database of power usage records 400 of FIG. 9A.

In operation 925, it can be determined whether there are more processes to launch. If not, then method 901 ends. If there are more processes to launch, then in operation 930, counter i is incremented and method 901 continues at operation 915.

Figure 10:
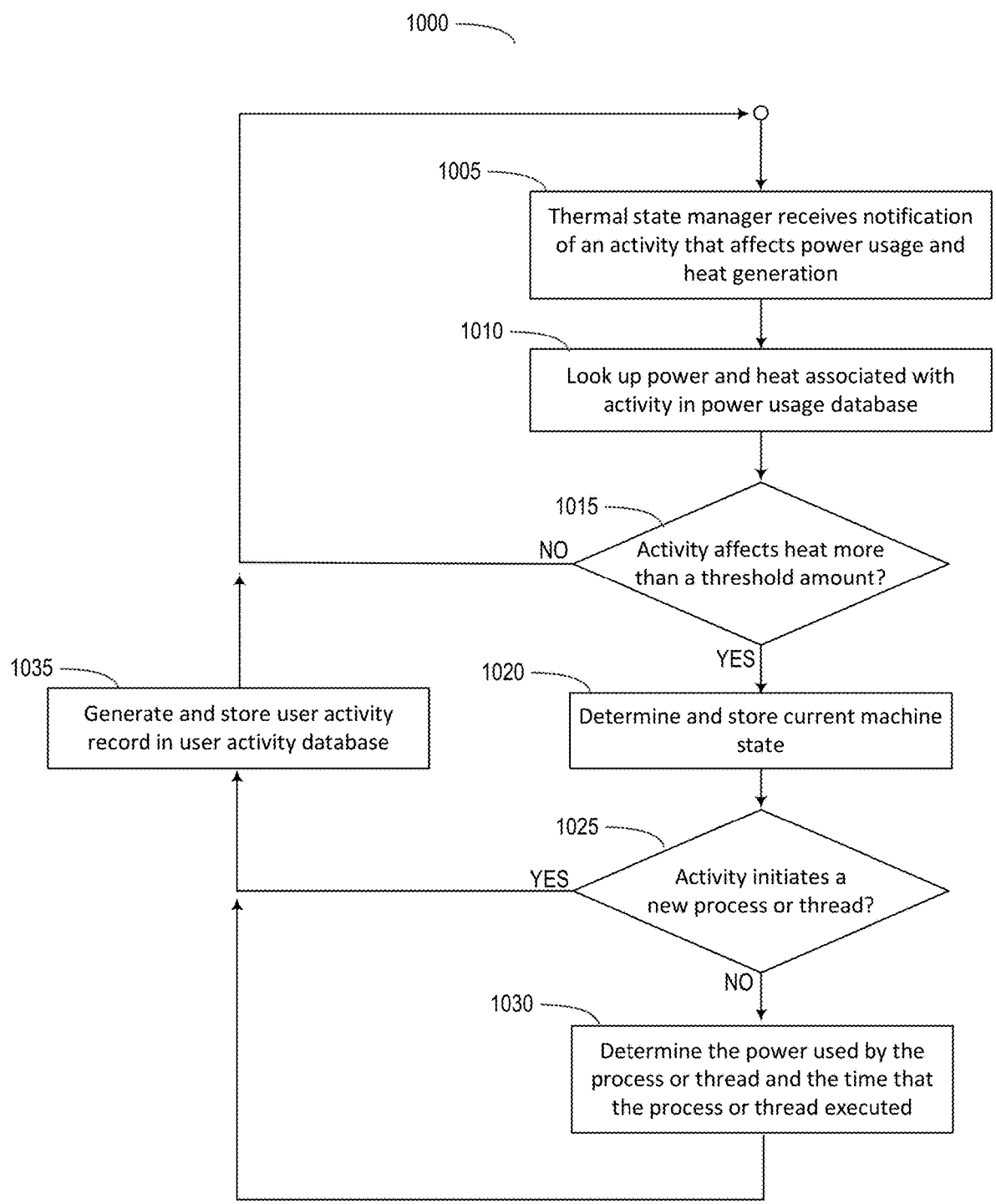
FIG. 10 illustrates a flow chart of a method of generating a history of user processing tasks, according to some embodiments.

FIG. 10 illustrates a flow chart of a method 1000 of generating a history of user processing tasks based upon user interaction with processing device 100. Like the power usage database 400, described above in FIGS. 9A and 9B, a history of user processing tasks 500 can include an initial "seed" database of user activities and a learned set of user activities. As user processing history is generated through usage of processing device 100, a weighting factor can favor the learned processing tasks over the initial "seed" database of processing tasks. Since the user processing history database attempts to learn the patterns of a particular user of a processing device 100, the initial "seed" database may be fairly sparse and the weighting factor in favor of learned user activities may be heavier than for the learned power usage records. Power usage should be, generally similar for a given processing task for both a factory setting and as learned through usage of processing device 100. Whereas user patterns of behavior may be quite specific for each different user.

An initial seed database for user processing history (activity) can be generated from crowd source data indicating user behavior patterns for one or more device types or types of users. For example, most users may review their email at 6:00 a.m. when getting up in the morning, and at noon and again at 6:00 p.m. when the user returns home. A manufacturer's engineer can generate an initial seed database of user processing tasks 500 based upon the crowd source data or from marketing information. An initial seed database of user processing tasks may be specific for a user from a particular geographic location. In an embodiment, the initial seed database of processing tasks can be downloaded from a manufacturer's website at a first time that a user powers up the processing device 100, or registers the processing device 100 with a manufacturer's service in a geographic area. For example, an initial "seed" user processing history database 500 may be appropriate for a Silicon Valley resident but a different initial "seed" user processing history database 500 may be appropriate for a mid-west farmer. In an embodiment, a user may select a personal profile or user type and/or a particular geographic area using an application on the processing device. In response to the selection, an appropriate initial seed user processing history database 500 can be downloaded to processing device 100.

In operation 1005, thermal state manager 150 can receive a notification of an activity that affects power usage and heat generation. The notification may be received from scheduler 122, from kernel 120, or from thermal and power management and device control 121. An activity may include launching of a user application 130, a thread of an application, a launching of a background processing task 140, or processing of a kernel task 123.

In operation 1010, thermal state manager 150 can look up power usage and heat generation associated with the activity in power usage database records 400. In an embodiment, task identification and power requires module 152 can look up the power and heat generation associated with the task.

It may be undesirable to track power usage for activities that use a very small amount of power. For example, cursor positioning activity may require only a small amount of power whereas a rendering operation may consume a significant amount of power and generate heat from a graphics processor unit (GPU). Thus, in operation 1015, it is determined whether the activity affects power usage or heat generated by more than a threshold amount. If the amount of power used or heat generated in the activity is less than a threshold amount, then the method 1000 resumes at operation 1005, otherwise the method resumes at operation 1020.

In operation 1020, the current machine state can be determined and can be stored. A machine state record is described with reference to FIG. 3, above. In an embodiment, a current machine state is regularly updated, e.g. by kernel 120. In such case, "determining" a current machine state includes reading a snapshot of a current machine state that is kept updated independently from method 1000.

In operation 1025, it can be determined whether the activity launches a new process or thread. If so, then in operation 1035, a new user activity record 500 can be generated and stored. User activity records 500 are described above with reference to FIG. 5. Then method 1000 resumes at operation 1005.

If, in operation 1025, it is determined that the activity is not a launching of a new process or thread, then power has likely been consumed by this existing process or thread over an elapsed time, relative to an initial activity record that was previously generated and stored in operation 1035, in response to determining in operation 1025 that the activity launched a new process or thread.

In operation 1030, the power usage for the process or thread can be determined. Also, the time that the process or thread has been executing can be determined. Then the method 1000 resumes at operation 1035, where a user activity record 500 can be generated for the process or thread, and stored along with the power usage and execution time for the process or thread. In an embodiment, user activity record 500 can be stored in association with a machine state record 300, referenced in field 507 of activity record 500. For example, a process may have been that the user was watching a video using the application Apple TV®. The machine state 300 may have been that the user watched the video at home, over a network connection, without using Wi-Fi or cellular data, and while the video and audio resolution were at highest quality. Machine state information 300, when associated with a user activity record 500, can be used to learn patterns of user activity behavior.

Figure 11:
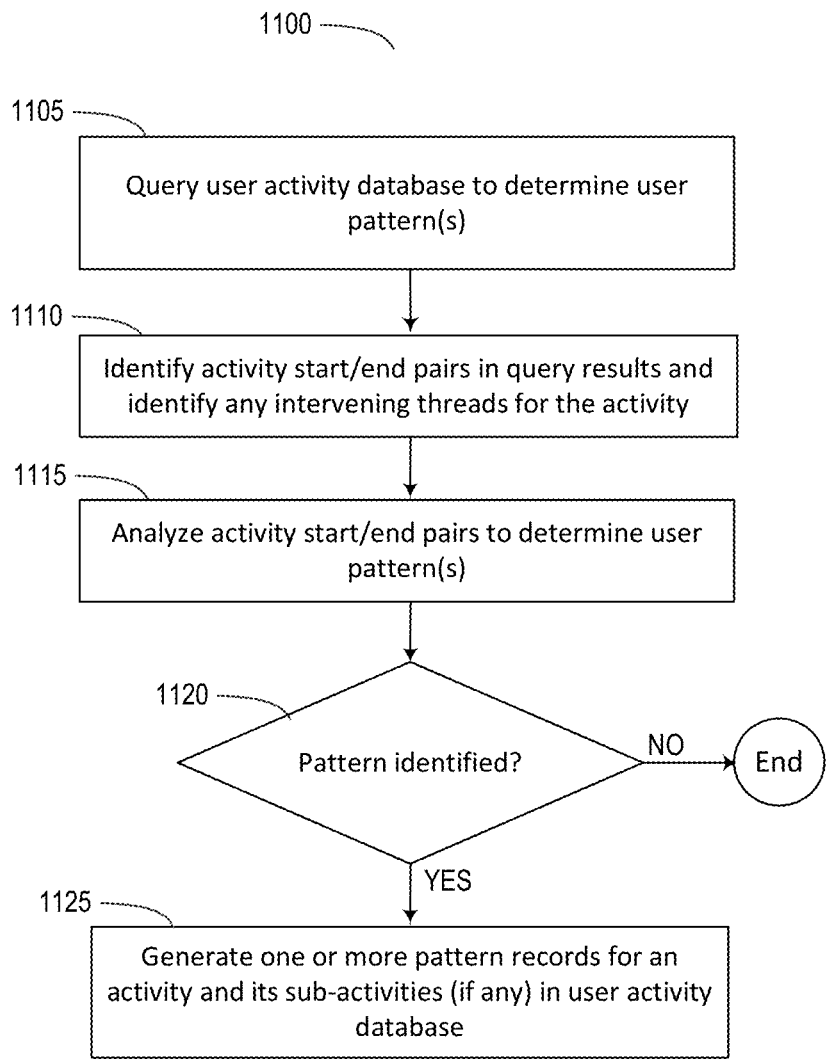
FIG. 11 illustrates a flow chart of a method for determining user behavior patterns from a history of user processing tasks.

FIG. 11 illustrates a flow chart of a method 1100 for determining user behavior patterns from a history of user processing tasks. Patterns of user behavior are helpful in predicting a future processing task that a user will perform, and preparing the machine state of the processing device 100 for the user in advance of the start of the predicted future processing task.

In operation 1105, a query can be initiated on the user activity database 500 to determine patterns in user behavior. The query can be narrowed by a time range, a day of the week, a particular process that uses more than a threshold amount of power, or other criteria to narrow a search for identifying patterns in user behavior.

In operation 1110, an activity is identified having an initial activity record that was generated when an activity generated a new process or thread in method 1000 of FIG. 10, above. An activity may have a matching ending record, having stored in it a duration for the process or thread and power usage over the duration of the process or thread.

In operation 1115, query results for processes or threads having matching starting and ending records can be analyzed. Analysis may include a secondary query against the matching starting/ending records to limit the query results. The secondary query can limit the query results by a particular application, by a particular day of the week, by a particular time of day, by weekday, by holiday, by weekend, by a particular machine state, or subset of machine state information, or by other pattern criteria.

In operation 1120, it is determined whether a pattern has been identified. A pattern may be, for example, this user checks email at about 6:00 a.m. every week day, or this user watches NetFlix® movies on Fridays at about 8:00 p.m. In an embodiment, the pattern may also include a particular machine state. For example, a pattern may indicate that this user only uses a high charging rate charger (a wall charger) at home on weekdays and uses a low charge rate (e.g. USB charger) during week days all day long. A machine state may also include that this user always plays video games using a network connection, e.g. Ethernet, at home on high resolution video, in the evenings. These machine state features can help predict a machine state for a future processing activity and can additionally be used to determine heat mitigation processes. For example, while the user plays video games at home with a network connection, the Wi-Fi and cellular data subsystems could be turned off to save power and reduce heat generation while the user plays video games.

In operation 1125, one or more learned process pattern records are generated and stored in user activity records 500. Example pattern records include records 575, 580, 585, and 590 with reference to FIG. 5, above. In an embodiment, a machine state record 300 can be stored in association with a learned process pattern record. In an embodiment, a machine state record for a learned process pattern can have a particular machine state record number range, such as having a high order bit set. Alternatively a machine state record 300 for a learned process pattern can have a field (not shown) identifying the machine state record 300 as being associated with a learned process pattern.

Figure 12:
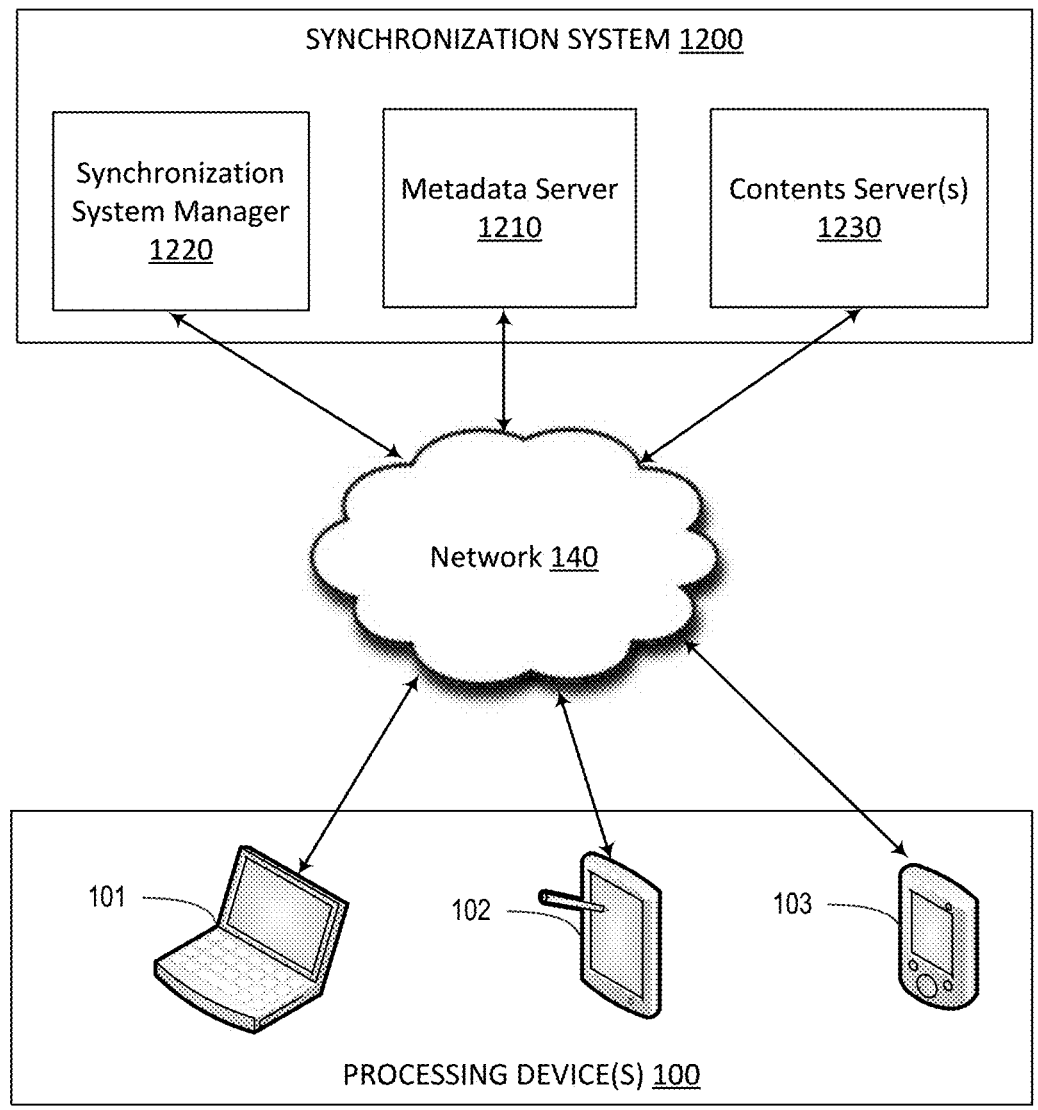
FIG. 12 illustrates, in block form, a system for synchronizing power usage data, machine state data, user processing task data and user behavior patterns for a plurality of processing devices, according to some embodiments.

FIG. 12 illustrates, in block form, a system 1200 for synchronizing power usage information, machine state information, user processing task history and user behavior patterns (collectively, machine state preparation data) for a plurality of processing devices 100.

A user may own multiple processing devices 100 (e.g. laptop 101, tablet 102, and Smartphone 103). In an embodiment, each processing device 100 can be registered with synchronization service 1200. A user may have patterns to their usage of processing devices 100 that can be used to synchronize machine state preparation data. In addition, synchronization system 1200 may be used to prepare a second processing device 102 for a selected future task, given information learned or obtained from a first processing device 101.

In an embodiment, synchronizing machine state preparation data across multiple devices can include synchronizing machine state information 300, power usage information 400, and processing activity records 500. Shared machine state information can include a first processing device notifying a second processing device as to a current state of the first processing device. In an example, a first processing device can detect that Comcast® network service failed at 6:00 p.m. In addition, or alternatively, the first processing device can learn from an internet alert or email message that the Comcast® network is down as of 6:00 p.m. A machine state record 300 on the first processing device can be synchronized with a second processing device of a user, such that the second device can learn that Comcast® is down as of 6:00 p.m. In another example, a first processing device may be the user's iPhone® and the second processing device may be the user's iPad®. A current machine state of the iPhone® may be that the user is not at home (FIG. 3, machine state record 300, field 370, parameter 1) and that the iPhone® is currently in motion (field 375, parameter 2) driving. One or more GPS readings, in conjunction with a time of date and a day of the week, can indicate that the user is driving home. The iPad® may have learned a user behavior pattern that the user watches the news on the iPad® using Hulu®, when she returns home. After synchronizing machine states 300 between the user's iPhone® and iPad®, the iPad® can learn that the user is on the way home. The iPad® can being preparing the machine state for the iPad® for the future processing task: the user watching the news on Hulu® on her iPad® when she arrives home. Preparation of the machine state of the iPad® can be in accordance with FIGS. 2A and 2B described herein. In addition, by synchronizing machine states, when the user and her iPhone® arrive home, the iPad® can learn from the iPhone® that the user is now home, and the iPad® can launch Hulu® on her preferred news channel.

Synchronization system 1200 can include a metadata server 1210 and one or more contents servers 1230. In one embodiment, a contents server 1230 can store one or more types of user data sets such as machine states 300, power usage information 400, and user processing information 500, including metadata, database records, and indices. In an embodiment, a contents server 1230 can be a cloud storage service capable of storing a wide variety of different user data set types. In one embodiment, synchronization system 1200 can further include a synchronization management system 1220. Initially, client device 100 can store one or more user data sets from the file system of client device 100 on synchronization system 1200. A user data set, such as a machine state database 300 on client device 100, can be stored on the synchronization system 1200. In one embodiment, the user data set can be chunked into chunked data portions and stored on the one or more contents servers 1230. Metadata describing the user data set and metadata about the chunked portions of the user data set can be stored on the metadata server 1230 in a synchronization metadata database. In one embodiment, the metadata server 1210 and contents server 1230 can be managed using a synchronization system manager 1220.

Managing the metadata server 1210 can include providing software to the metadata server 1210 to resolve conflicts between various versions of data sets of a user, including conflicts resulting from different versions of a software that generated a data set. For example, if one client device of a user, e.g. 101, has word processor software that is version 2.0, and the user generates a word processing document using that client device and software, and the document is later downloaded using the synchronization system 1200 to a different client device of the user, e.g. 102, having version 1.0 of the word processor software, the version 1.0 software may not be able to open and/or edit the document that was generated by software version 2.0. Synchronization system manager 1260 can provide software updates and patches to the metadata server 1210 to adapt the document for use with both version 1.0 and version 2.0 of the word processing software. Similarly, a machine state 300 on a first client device 101 may utilize features that are not supported by a second client device 102, or have specifications that differ on the second client device 102. For example, client device 101 may have a machine that utilizes a "location" feature based upon a GPS signal. Client device 102 may only be able to detect location by cell tower approximation, area code, or IP address. Synchronization system manager 1220 can modify the "location" feature in the machine state of client device 101 before synchronizing the predictor with client device 102. Alternatively, synchronization system manager 1220 can remove a feature from a predictor that is not supported by a target client device before synchronizing predictors. In an embodiment, a modified predictor and be flagged or otherwise marked as to the change made to a predictor before synchronization.

Synchronization system 1200 can be interfaced to the client device(s) 100 via a network 140. Network 140 can be the Internet, a wireless network, a cellular network, a local area network, or any combination of these. Although the synchronization system manager 1220, metadata server 1210, and contents server 1230 have been shown as separate elements, connected via a network 140, this need not be the case. One or more of the synchronization system manager system 1220, metadata server 1210, or contents server 1230 can be implemented on the same host computer system or on several physically distributed computer systems. In addition, as described above, contents server 1230 can include one or more content servers 1230, any or all of which can store one or more types of user data sets. Communication between one or more of the synchronization system manager 1220, metadata server 1210, and contents server(s) 1230 can be by sockets, messages, shared memory, an application program interface (API), inter-process communication, or other processing communication service. Application programming interfaces are described in detail, below, with reference to FIG. 14.

A client device 100 can include a desktop computer system, a laptop computer system such as client device 101, a tablet computer system such as client device 102, a cellular telephone such as client device 103, a personal digital assistant (PDA) including cellular-enabled PDAs, a set top box, an entertainment system, a gaming device, or other consumer electronic device. The components of a client device 100 are described in detail, below, with reference to FIG. 15.

A user data set can include one or more of: a machine state database, a user processing activity database, and power usage database. A user data set can further include a local search and feedback history database, a local database, a data file, a folder or directory, a word processing document, a spreadsheet, a presentation, emails, texts, user contacts, bookmarks, assets such as music, movies, and other purchased content, device settings, and application settings. Each of these can be a user data set. A user of a client device 100 can determine, on a per-device basis, whether a particular data set will, or will not, be synchronized with other of the user's client devices 100 using the synchronization system 1200.

Metadata about user data sets can include file system metadata and synchronization metadata. File system metadata can include a file ID, such as a POSIX file ID, a document ID, a creation date of the file, a date that the file was last modified, an identifier of the device that last modified the file, an identifier of the application and version of the application that modified the file, and a generation count for the file. For assets, such as purchased content that are already stored remotely at a service such as iTunes® or Amazon Cloud®, metadata about the content can include a Universal Resource Locator (URL) that points to where the content is located. File system metadata can be generated by the file system of each client device 100. Synchronization metadata can include a universally unique identifier (UUID) for a file or a directory that is unique across the client devices 100 of a user, and can further include ETAGS. ETAGS can specify a specific version of the metadata for a document or a directory. ETAGS can be generated by the synchronization system 100 to manage the user data sets and resolve conflicts between differing generations of user data for a particular user data set. For example, an ETAG can be used to distinguish different generations of a word processing document of the resume of the user.

Figure 13:
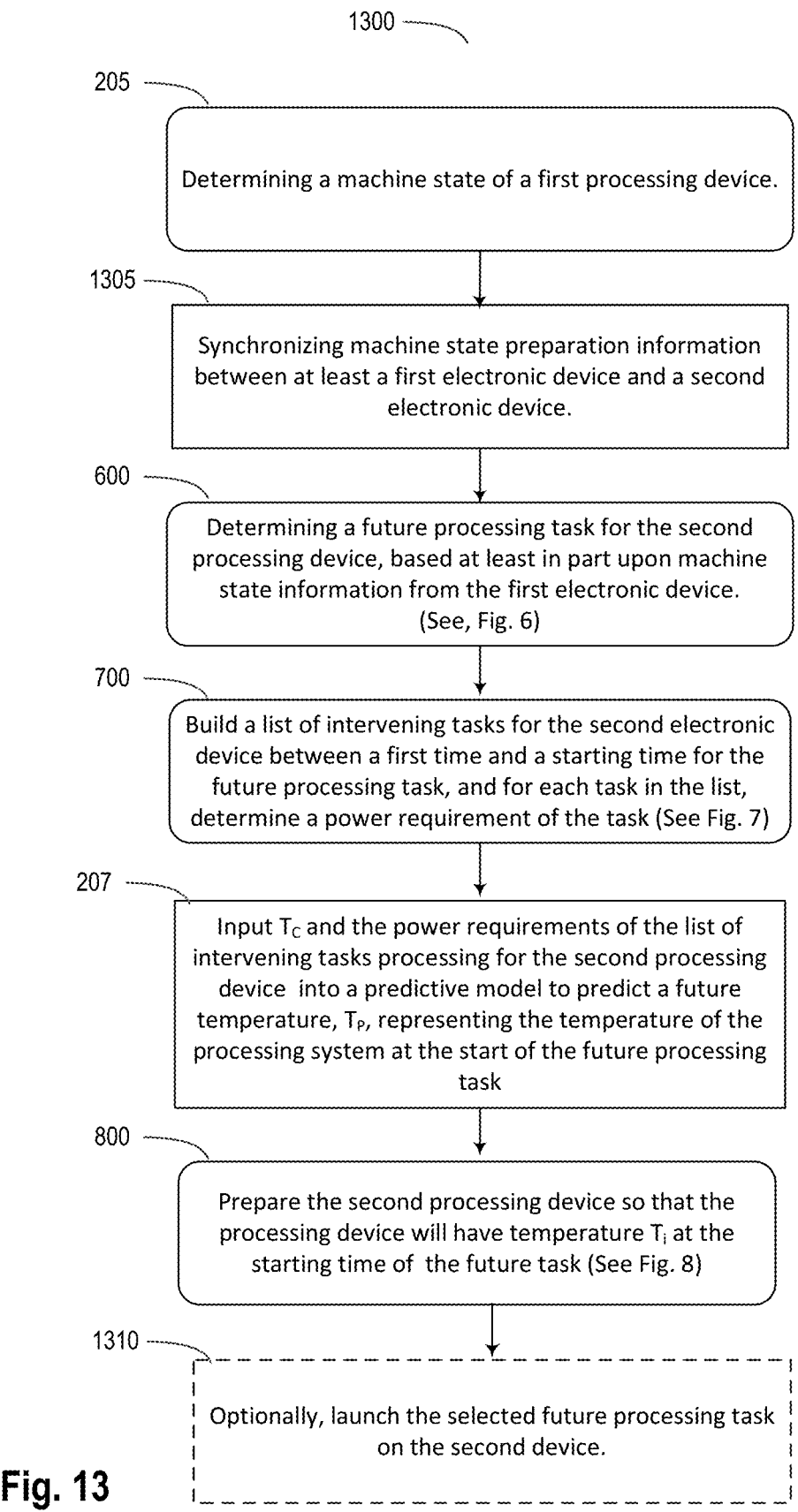
FIG. 13 illustrates a flow chart of a method for synchronizing one or more of machine states, user processing task history, and user behavior patterns for a plurality of processing devices.

FIG. 13 illustrates a flow chart of a method for synchronizing one or more of machine states, user processing task history, and user behavior patterns for a plurality of devices. For example, a first processing device could be an iPhone® and a second processing device could be an iPad®.

In operation 205, a machine state 300 of a first processing device can be determined and stored, as described with reference to FIG. 2, above. For example, a machine state 300 for a user's iPhone® could be determined. It may be determined that the user is in motion, driving, on a weekday, after 7:00 p.m. and based upon GPS coordinates, the user is driving toward home.

In operation 1305, machine state preparation information can be synchronized between one or more of a user's devices, e.g. 101, 102, and 103 of FIG. 12. Machine state preparation information can include machine state records 300, power usage information 400, and user processing activity and learned patterns 500.

In operation 600, a future processing task for the second processing device can be determined. The future processing task can include a start time and an initial thermal state $T_i$ at the time of starting the future processing task. For example, the iPad® may have learned a behavior that the user watches the news after 7:00 p.m. on weeknights. The iPhone® can assist the iPad® in preparing itself for the future processing task.

In operation 700, a list of intervening processing tasks can be generated for the iPad®. In an embodiment, the first processing device (iPhone®) can generate the list of intervening tasks on behalf of the second processing device (iPad®) be virtue of the synchronization operation 1305, above. A power usage associated with each task in the list of intervening processing tasks can be determined from the second device's power usage records 400 and user processing activity records 500. In an embodiment, the first electronic device can determine the power usage requirements for the intervening processing tasks on behalf of the second processing device. The list of intervening tasks can be synchronized between the first and second processing devices using synchronization system 1200.

In operation 207, an initial temperature $T_C$ for the second device can be input into a feed-forward thermal prediction model 210. The list of intervening tasks and associate power usage requirements for the intervening tasks can be input into the feed-forward prediction model 210. In an embodiment, the first processing device 100 (iPhone®) performs the feed-forward thermal prediction on behalf of the second processing device (iPad®). The output of the feed-forward thermal prediction model can include a predicted thermal state $T_P$ for the second processing device.

In operation 800, the second processing device can be prepared so that the second processing device will have the initial state Ti at the start time for the future processing task. In an embodiment, the second processing device may employ more severe cooling measures that if only one device is involved in the preparation, because the user may not be in the presence of both the first and second devices at the same time. For example, the cooling systems on the iPad® could be run at maximum up until the user's first processing device (iPhone®) determines that its machine state is "at home" such that the user is not present with both processing devices.

In operation 1310, optionally the second processing device launch the future processing task on the second processing device. In an embodiment, the second processing device and first processing device can synchronize machine states when the first processing device detects that it has arrived "at home." In response to detecting that the first electronic device (iPhone®) is "at home" (and thus, so is the user), the second processing device can launch the future processing task on the second processing device. Continuing with the example, above, the iPad® can launch the news application in response to the detecting that the machine state of the first processing device indicates that the first processing device is, "at home."

Figure 14:
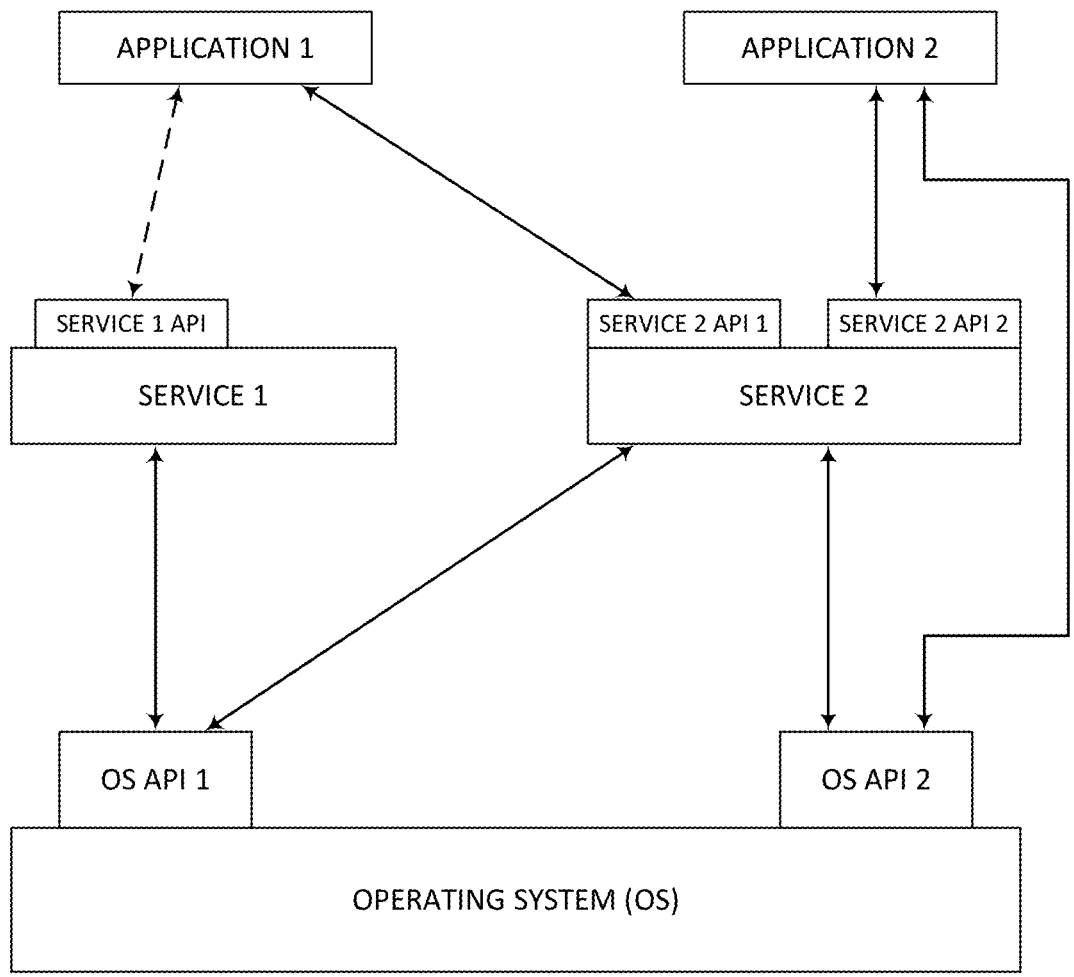
FIG. 14 illustrates an exemplary embodiment of a software stack usable in some embodiments of the invention.

In FIG. 14 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2, Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Figure 15:
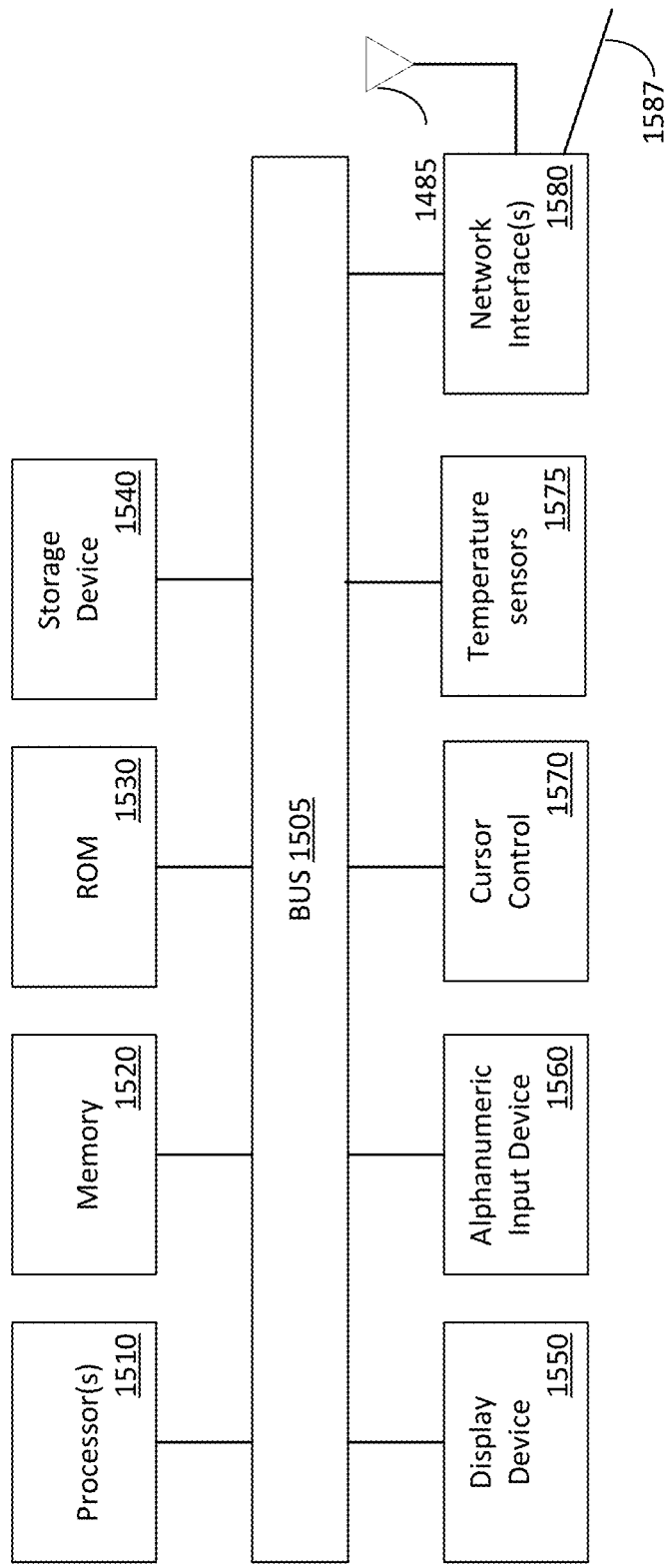
FIG. 15 is a block diagram of one embodiment of a processing system.

FIG. 15 is a block diagram of one embodiment of a computing system 1500. The computing system illustrated in FIG. 15 is intended to represent a range of computing systems (either wired or wireless) including, for example, desktop computer systems, laptop computer systems, cellular telephones, tablet computers, personal digital assistants (PDAs) including cellular-enabled PDAs, set top boxes, entertainment systems or other consumer electronic devices. Cellular telephones can include SmartPhones, such as Apple's iPhone®. Tablet computers can include, e.g., Apple's iPad® or Microsoft's Surface®. Alternative computing systems may include more, fewer and/or different components. The computing system of FIG. 15 may be used to provide the client device and/or the server device.

Computing system 1500 includes bus 1505 or other communication device to communicate information, and processor 1510 coupled to bus 1505 that may process information.

While computing system 1500 is illustrated with a single processor, computing system 1500 may include multiple processors and/or co-processors 1510. Computing system 1500 further may include random access memory (RAM) or other dynamic storage device 1520 (referred to as main memory), coupled to bus 1505 and may store information and instructions that may be executed by processor(s) 1510. Main memory 1520 may also be used to store temporary variables or other intermediate information during execution of instructions by processor 1510.

Computing system 1500 may also include read only memory (ROM) 1530 and/or other static storage device 1540 coupled to bus 1505 that may store static information and instructions for processor(s) 1510. Data storage device 1540 may be coupled to bus 1505 to store information and instructions. Data storage device 1540 such as flash memory or a magnetic disk or optical disc and corresponding drive may be coupled to computing system 1500.

Computing system 1500 may also be coupled via bus 1505 to display device 1550, such as a cathode ray tube (CRT) or liquid crystal display (LCD), to display information to a user. Computing system 1500 can also include an alphanumeric input device 1560, including alphanumeric and other keys, which may be coupled to bus 1505 to communicate information and command selections to processor(s) 1510. Another type of user input device is cursor control 1570, such as a touchpad, a mouse, a trackball, or cursor direction keys to communicate direction information and command selections to processor(s) 1510 and to control cursor movement on display 1550.

Computing system 1500 further may include one or more network interface(s) 1580 to provide access to a network, such as a local area network. Network interface(s) 1580 may include, for example, a wireless network interface having antenna 1585, which may represent one or more antenna(e). Computing system 1500 can include multiple wireless network interfaces such as a combination of WiFi, Bluetooth and cellular telephony interfaces. Network interface(s) 1580 may also include, for example, a wired network interface to communicate with remote devices via network cable 1587, which may be, for example, an Ethernet cable, a coaxial cable, a fiber optic cable, a serial cable, or a parallel cable.

In one embodiment, network interface(s) 1580 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1580 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Processing system 1500 can further include temperature sensors 1575. Temperature sensors 1575 can include thermo-couples, on-chip thermal detector I/O's, or other sensor types. Temperature sensors 1575 can be included for individual hardware components, e.g. CPU or GPU, or other high-power high-heat components, and can further include one or more temperatures sensors placed within processing device 1500 to sense temperature of the air within processing device 1500.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method, comprising:
   determining a future processing task for a processing device, a start time for the future processing task, a machine state stored in association with the future processing task, and a predicted duration for the future processing task wherein determining the future processing task, the start time, the machine state, and the predicted duration comprises querying a processing activity database of tasks that have been previously performed using the processing device;
   determining a predicted power usage and predicted heat generated by the future processing task, from at least the machine state and predicted duration of the future processing task;
   predicting a plurality of processing tasks for the processing device between a first time and the future start time, each processing task of the plurality of processing tasks having an associated power requirement to perform the processing task;
   predicting a future temperature of the processing device, $T_P$, that the processing device will be at the future start time of the future processing task, based upon a current temperature of the processing device and the power requirements to perform one or more of the plurality of processing tasks;
   determining an initial temperature $T_I$ for the processing device at the start time of the future processing task, based at least in part on the predicted power usage and predicted heat generated to perform the future processing task;
   in response to the $T_P$ being greater than $T_I$, preparing the processing device so that the temperature of the processing device at the start of the future processing task is less than or equal to the temperature, $T_I$, wherein preparing the processing device comprises modifying one or more processing characteristics of at least one of the plurality of predicted processing tasks and scheduling the at least one of the plurality of processing tasks for execution on the processing device;
   executing the future processing task on the processing device.

2. The method of claim 1, wherein results of the query comprise tasks that have been performed within the week previous to the first time, and the method further comprises:
   filtering the results of the query by excluding future processing tasks that consume less than a threshold amount of power over a predetermined duration of time; and
   determining the future processing task comprises selecting a query result having one or more of: the longest duration, uses the highest amount of power per unit of time, or returns the most processing activity records that indicate a pattern of behavior by a user.

3. The method of claim 2, wherein a pattern of user behavior comprises one or more of: determining an approximate time of day that a user starts a particular task, determining an approximate duration that the user performs the particular task, or determining a particular day of the week that the user performs the particular task.

4. The method of claim 2, wherein predicting the plurality of processing tasks for the processing device further comprises correlating past processing tasks with one or more sensor values of the processing device.

5. The method of claim 4, wherein correlating a past processing task with one or more sensor values of the processing comprises correlating the running of a past processing task with one or more of: a location, a time of day, a day of a week, whether the processing device is connected to a network, or a signal strength of a network.

6. The method of claim 1, wherein predicting the plurality of processing tasks comprises:
   querying a history of processes for the processing device that have historically been performed during a window of time from the first time to the future start time;
   looking up a power requirement and estimated duration for each process in the results from the query of the history of processes;
   filtering the history of processes to exclude those processes having a power requirement less than a threshold value.

7. The method of claim 6, wherein the query is further limited to one of: a particular day of the week, any weekend day, or any weekday.

8. The method of claim 6, wherein determining the power requirement of the processing task comprises multiplying an incremental power usage for the processing task, retrieved from the database of power usage data, by the predicted duration of the processing task retrieved from a history of past processing tasks.

9. The method of claim 1, wherein preparing the processing device comprises one or more of: rescheduling one or more of the plurality of predicted processing tasks to later time, or lowering the scheduling priority of one or more of the plurality of predicted processing tasks.

10. The method of claim 1, wherein $T_I$ is selected such that a temperature of the processing device remains below a threshold for triggering heat-reducing procedures for the predicted duration of the future processing task, based on predicted power requirements for the future processing task.

11. The method of claim 1, wherein determining the future processing task comprises querying a processing activity database of tasks that have previously been regularly performed by a particular user of the processing device.

12. The method of claim 1, wherein the machine state comprises a plurality of processing subsystems historically used to perform the future processing task, and parameters of those processing resources when historically used to perform the future processing task, as determined from query results returned from the activity database.

13. The method of claim 1, wherein the future processing task is the task having the longest duration or the task having the highest priority from among the activity database records returned from the query.

14. The method of claim 1, wherein the start time for the future processing task is predicted from a learned pattern of one or more previous instances of performing the future processing task, wherein the machine state is stored in association with one or more previous instances of performing the future processing task, as determined from query results returned from the activity database.

15. A non-transitory computer-readable medium programmed with executable instructions that, when executed, perform a method comprising the operations:
   determining a future processing task for a processing device, at start time for the future processing task, a machine state associated with the future processing task, and a predicted duration for the future processing task, wherein determining the future processing task, the start, the machine state, and the predicted duration comprises querying a processing activity database of tasks that have been previously performed using the processing device;

determining a predicted power usage and heat generated by the future processing task, from at least the machine state and predicted duration of the future processing task;

predicting a plurality of processing tasks for the processing device between a first time and the future start time, each processing task of the plurality of processing tasks having an associated power requirement to perform the processing task;

predicting a future temperature of the processing device, $T_P$, that the processing device will be at the future start time of the future processing task, based upon a current temperature of the processing device and the power requirements to perform one or more of the plurality of processing tasks;

determining an initial temperature $T_I$ for the processing device at the start time of the future processing task, based at least in part on the predicted power usage and predicted heat generated to perform the future processing task;

in response to the $T_P$ being greater than $T_I$, preparing the processing device so that the temperature of the processing device at the start of the future processing task is less than or equal to the temperature, $T_I$, wherein preparing the processing device comprises modifying one or more processing characteristics of at least one of the plurality of predicted processing tasks and scheduling the at least one of the plurality of processing tasks for execution on the processing device;

executing the future processing task on the processing device.

16. The medium of claim 15, wherein results of the query comprise tasks that have been performed within the week previous to the first time, and the operations further comprise:

filtering the results of the query by excluding future processing tasks that consume less than a threshold amount of power over a predetermined duration of time; and determining the future processing task comprises selecting a query result having one or more of: the longest duration, uses the highest amount of power per unit of time, or returns the most processing activity records that indicate a pattern of behavior by a user.

17. The medium of claim 16, wherein a pattern of user behavior comprises one or more of: determining an approximate time of day that a user starts a particular task, determining an approximate duration that the user performs the particular task, or determining a particular day of the week that the user performs the particular task.

18. The medium of claim 16, wherein predicting the plurality of processing tasks for the processing device further comprises correlating past processing tasks with one or more sensor values of the processing device.

19. The medium of claim 18, wherein correlating a past processing task with one or more sensor values of the processing comprises correlating the running of a past processing task with one or more of: a location, a time of day, a day of a week, whether the processing device is connected to a network, or a signal strength of a network.

20. The medium of claim 15, wherein predicting the plurality of processing tasks comprises:

querying a history of processes for the processing device that have historically been performed during a window of time from the first time to the future start time;

looking up a power requirement and estimated duration for each process in the results from the query of the history of processes;

filtering the history of processes to exclude those processes having a power requirement less than a threshold value.

21. The medium of claim 20, wherein determining the power requirement of the processing task comprises multiplying an incremental power usage for the processing task, retrieved from the database of power usage data, by the predicted duration of the processing task retrieved from a history of past processing tasks.

22. The medium of claim 15, wherein the query is further limited to one of: a particular day of the week, any weekend day, or any weekday.

23. The medium of claim 15, wherein preparing the processing device comprises one or more of: rescheduling one or more of the plurality of predicted processing tasks to later time, or lowering the scheduling priority of one or more of the plurality of predicted processing tasks.

24. The medium of claim 15, wherein $T_I$ is selected such that a temperature of the processing device remains below a threshold for invoking heat-reducing procedures for the predicted duration of the future processing task.

25. A processing device comprising:
one or more processors;
a storage comprising a history of past processing tasks and a database of power usage data, coupled to the one or more processors; and
a memory coupled to one more processors, the memory programmed with executable instructions that, when executed, perform a method comprising the operations:

determining a future processing task for the processing device, a start time for the future processing task, a machine state stored in association with the future processing task, and a predicted duration for the future processing task, wherein determining the future processing task, the start time, the machine state, and he predicted duration comprises querying a processing activity database of tasks that have been previously performed using the processing device;

determining a predicted power usage and predicted heat generated by the future processing task, from at least the machine state and predicted duration of the future processing task;

predicting a plurality of processing tasks for the processing device between a first time and the future start time, each processing task of the plurality of processing tasks having an associated power requirement to perform the processing task;

predicting a future temperature of the processing device, $T_P$, that the processing device will be at the future start time of the processing task, based upon a current temperature of the processing device and the power requirements to perform one or more of the plurality of processing tasks;

determining an initial temperature $T_I$ for the processing device at the start time of the future processing task, based at least in part on the predicted power usage and predicted heat generated to perform the future processing task;

in response to the $T_P$ being greater than a temperature $T_I$, preparing the processing device so that the temperature of the processing device at the start of the future processing task is less than or equal to the temperature, $T_I$, wherein preparing the processing device comprises modifying one or more processing characteristics of at least one of the plurality of predicted processing tasks and scheduling the at least one of the plurality of processing tasks for execution on the processing device;

executing the future processing task on the processing device.

26. The processing device of claim 25, wherein results of the query comprise tasks that have been performed within the week previous to the first time, the operations further comprising:

filtering the results of the query by excluding future processing tasks that consume less than a threshold amount of power over a predetermined duration of time; and determining the future processing task comprises selecting a query result having one or more of: the longest duration, uses the highest amount of power per unit of time, or returns the most processing activity records that indicate a pattern of behavior by a user.

27. The processing device of claim 26, wherein a pattern of user behavior comprises one or more of: determining an approximate time of day that a user starts a particular task, determining an approximate duration that the user performs the particular task, or determining a particular day of the week that the user performs the particular task.

28. The processing device of claim 26, wherein predicting the plurality of processing tasks for the processing device further comprises correlating past processing tasks with one or more sensor values of the processing device.

29. The processing device of claim 28, wherein correlating a past processing task with one or more sensor values of the processing comprises correlating the running of a past processing task with one or more of: a location, a time of day, a day of a week, whether the processing device is connected to a network, or a signal strength of a network.

30. The processing device of claim 25, wherein predicting the plurality of processing tasks comprises:

querying a history of processes for a particular user of the processing device that have historically been performed during a window of time from the first time to the future start time;

looking up a power requirement and estimated duration for each process in the results from the query of the history of processes;

filtering the history of processes to exclude those processes having a power requirement less than a threshold value.

31. The processing device of claim 30, wherein the query is further limited to one of: a particular day of the week, any weekend day, or any weekday.

32. The processing device of claim 30, wherein determining the power requirement of the processing task comprises multiplying an incremental power usage for the processing task, retrieved from the database of power usage data, by the predicted duration of the processing task retrieved from a history of past processing tasks.

33. The processing device of claim 25, wherein preparing the processing device comprises one or more of: rescheduling one or more of the plurality of predicted processing tasks to later time, or lowering the scheduling priority of one or more of the plurality of predicted processing tasks.

34. The processing device of claim 25, wherein $T_I$ is selected such that a temperature of the processing device remains below a threshold for triggering heat-reducing procedures for the predicted duration of the future processing task, based on predicted power requirements for the future processing task.

* * * * *